(12) United States Patent
Kagawa et al.

(10) Patent No.: US 11,323,576 B2
(45) Date of Patent: May 3, 2022

(54) IMAGE PROCESSING APPARATUS, IMAGE PROCESSING METHOD, AND NON-TRANSITORY COMPUTER-READABLE MEDIUM

(71) Applicant: CANON KABUSHIKI KAISHA, Tokyo (JP)

(72) Inventors: Hidetsugu Kagawa, Kawasaki (JP); Shuhei Ogawa, Kawasaki (JP); Maya Yazawa, Kawasaki (JP); Kouta Murasawa, Yokohama (JP); Tetsuya Suwa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/444,223

(22) Filed: Jun. 18, 2019

(65) Prior Publication Data
US 2020/0007695 A1    Jan. 2, 2020

(30) Foreign Application Priority Data

Jun. 29, 2018   (JP) ............................. JP2018-125046
Jun. 29, 2018   (JP) ............................. JP2018-125278
Nov. 2, 2018    (JP) ............................. JP2018-207405

(51) Int. Cl.
    *H04N 1/60*     (2006.01)
    *H04N 1/00*     (2006.01)
    *H04N 1/401*    (2006.01)

(52) U.S. Cl.
    CPC ......... *H04N 1/00167* (2013.01); *H04N 1/401* (2013.01); *H04N 1/60* (2013.01)

(58) Field of Classification Search
    CPC ... H04N 1/6058; H04N 1/6069; H04N 1/6005
    See application file for complete search history.

(56) References Cited

U.S. PATENT DOCUMENTS 6,646,762 B1 * 11/2003 Balasubramanian ........................
                                                    H04N 1/6058
                                                          358/1.9
7,009,734 B2    3/2006 Suwa et al. .................... 358/1.9
(Continued)

FOREIGN PATENT DOCUMENTS

CN    1578475         2/2005
CN    101583040      11/2009
(Continued)

OTHER PUBLICATIONS

Extended European Search Report dated Nov. 25, 2019 in counterpart EP Application 19182062.0.
(Continued)

*Primary Examiner* — King Y Poon
*Assistant Examiner* — Michael Burleson
(74) *Attorney, Agent, or Firm* — Venable LLP

(57) ABSTRACT

An image processing apparatus comprises: an obtaining unit that obtains a luminance of an input image having a color reproduction range wider than that of a printing apparatus; a conversion unit that performs, for the input image, conversion processing of obtaining a value included in the color reproduction range of the printing apparatus and obtaining the luminance of the image after the conversion; and a correction unit that corrects the luminance of the input image, wherein the correction unit performs correction of the luminance of the input image based on a conversion characteristic between the obtained luminance and the obtained luminance such that an intensity of the correction becomes higher for a color that is not included in the color reproduction range of the printing apparatus than for a color included in the color reproduction range of the printing apparatus.

67 Claims, 17 Drawing Sheets

(56) References Cited

U.S. PATENT DOCUMENTS

| | | | |
|---|---|---|---|
| 7,016,530 B2 | 3/2006 | Saito et al. | 382/162 |
| 7,075,679 B2 | 7/2006 | Goto et al. | 358/3.01 |
| 7,145,693 B2 | 12/2006 | Kagawa | 358/1.9 |
| 7,339,703 B2 | 3/2008 | Kagawa | 358/1.9 |
| 7,471,847 B2 | 12/2008 | Yano | 382/274 |
| 9,113,113 B2 | 8/2015 | Thiebaud et al. | H04N 1/6058 |
| 9,900,475 B2 | 2/2018 | Chen | G06T 7/13 |
| 10,129,511 B2 | 11/2018 | Nose | H04N 9/3164 |
| 2006/0056683 A1* | 3/2006 | Komatsu | G06F 3/1284 382/162 |
| 2017/0061591 A1* | 3/2017 | Park | G06T 7/90 |
| 2017/0195526 A1 | 7/2017 | Chen | H04N 1/6052 |
| 2017/0249721 A1* | 8/2017 | Hirai | G06T 5/001 |
| 2018/0035088 A1* | 2/2018 | Nose | H04N 5/23229 |

FOREIGN PATENT DOCUMENTS

| | | |
|---|---|---|
| CN | 104967761 | 10/2015 |
| EP | 2120449 | 11/2009 |
| JP | 2008-078737 | 4/2008 |
| JP | 2011-086976 | 4/2011 |
| JP | 2018-026794 | 2/2018 |

OTHER PUBLICATIONS

Guangyuan Wu, Shijun Niu, Xiaozhou Li, and Guichun Hu "Cross-media color reproduction using the frequency-based spatial gamut mapping algorithm based on human color vision", Proc. SPIE 10615, Ninth International Conference on Graphic and Image Processing (ICGIP 2017), 106153Y (Apr. 10, 2018); https://doi.org/10.1117/12.2302924.

Office Action dated Aug. 24, 2021 in counterpart Chinese Application No. 201910575192.1, together with English translation thereof.

Office Action dated Jan. 17, 2022 in counterpart Japanese Application No. 2019-109023, together with English translation thereof.

* cited by examiner

BEFORE D RANGE COMPRESSION

AFTER D RANGE COMPRESSION

|  | REFERENCE COLOR | CONTRAST TARGET COLOR | ΔRGB |
|---|---|---|---|
| INPUT | (224,0,0) | (232,8,8) | 13.9 |
| OUTPUT | (220,8,8) | (216,12,12) | 6.9 |

| LUMINANCE VALUE (nit) | HIGH SENSITIVITY FREQUENCY Uh (cycle/degree) |
|---|---|
| 0.001 | 0.1 |
| 0.01 | 0.3 |
| 0.1 | 0.5 |
| 1 | 1 |
| 10 | 1.8 |
| 100 | 2.9 |
| 1000 | 3.3 |

IMAGE PROCESSING APPARATUS, IMAGE PROCESSING METHOD, AND NON-TRANSITORY COMPUTER-READABLE MEDIUM

BACKGROUND OF THE INVENTION

Field of the Invention

The present invention relates to an image processing apparatus, an image processing method, and a non-transitory computer readable medium.

Description of the Related Art

In recent years, HDR (High Dynamic Range) contents having a high luminance and a wide color gamut reproduction range have become popular. An HDR content is expressed using a peak luminance of 1,000 nit (1,000 cd/m$^2$) or more within the color gamut range of BT.2020 (Rec.2020). When printing is performed by a printing apparatus using HDR image data, the dynamic range (to be referred to as a "D range" hereinafter) of the luminance needs to be compressed by D range compression using a tone curve or the like to a dynamic range that the printing apparatus can reproduce. For example, as shown in FIG. 1, the contrast of an area with a high luminance is reduced, thereby performing D range compression. For example, Japanese Patent Laid-Open No. 2011-86976 discloses image processing of correcting contrast lowering that occurs when the D range compression is performed.

The image data that has undergone the D range compression to the luminance range of the printing apparatus needs to be subjected to gamut mapping to the color gamut of the printing apparatus. FIG. 2A shows the color gamut of BT.2020 within a luminance range of 1,000 nit. FIG. 2B shows the color gamut of the printing apparatus. In FIGS. 2A and 2B, the abscissa represents y of the xy chromaticity, and the ordinate represents the luminance. When comparing the color gamut of BT.2020 with that of the printing apparatus, the color gamut shapes are not similar because color materials in use are different. Hence, when printing an HDR content by the printing apparatus, the degree of luminance compression needs to be changed in accordance with the chromaticity, instead of evenly compressing the D range.

At this time, in a case in which the shape of the color gamut of input image data and the shape of the color gamut of the printing apparatus are largely different, even when contrast correction is performed using the method of Japanese Patent Laid-Open No. 2011-86976, the contrast intensity lowers at the time of printing by the printing apparatus due to compression by gamut mapping.

SUMMARY OF THE INVENTION

According to one aspect of the present invention, there is provided an image processing apparatus comprising: an obtaining unit configured to obtain a luminance of an input image having a color reproduction range wider than that of a printing apparatus; a conversion unit configured to perform, for the input image, conversion processing of obtaining a value included in the color reproduction range of the printing apparatus and obtaining the luminance of the image after the conversion; and a correction unit configured to correct the luminance of the input image, wherein the correction unit performs correction of the luminance of the input image based on a conversion characteristic between the luminance obtained by the obtaining unit and the luminance obtained by the conversion unit such that an intensity of the correction becomes higher for a color that is not included in the color reproduction range of the printing apparatus than for a color included in the color reproduction range of the printing apparatus.

According to another aspect of the present invention, there is provided an image processing apparatus comprising: an obtaining unit configured to obtain a luminance of an input image having a color reproduction range wider than that of a printing apparatus; a conversion unit configured to perform, for the input image, conversion processing of obtaining a value included in the color reproduction range of the printing apparatus and obtaining the luminance of the image after the conversion; and a correction unit configured to correct the luminance of the input image to suppress lowering of a contrast of the input image, wherein the correction unit corrects a high-frequency component of the image based on a luminance of a low-frequency component of the image such that a luminance of the high-frequency component of the image after the conversion processing is included in a luminance range of the image after the correction by the correction unit.

According to another aspect of the present invention, there is provided an image processing method comprising: obtaining a luminance of an input image having a color reproduction range wider than that of a printing apparatus; performing, for the input image, conversion processing of obtaining a value included in the color reproduction range of the printing apparatus and obtaining the luminance of the image after the conversion; and correcting the luminance of the input image, wherein in the correcting, correction of the luminance of the input image is performed based on a conversion characteristic between the luminance obtained in the obtaining and the luminance obtained in the performing the conversion processing such that an intensity of the correction becomes higher for a color that is not included in the color reproduction range of the printing apparatus than for a color included in the color reproduction range of the printing apparatus.

According to another aspect of the present invention, there is provided a non-transitory computer-readable medium storing a program that causes a computer to function as: an obtaining unit configured to obtain a luminance of an input image having a color reproduction range wider than that of a printing apparatus; a conversion unit configured to perform, for the input image, conversion processing of obtaining a value included in the color reproduction range of the printing apparatus and obtaining the luminance of the image after the conversion; and a correction unit configured to correct the luminance of the input image, wherein the correction unit performs correction of the luminance of the input image based on a conversion characteristic between the luminance obtained by the obtaining unit and the luminance obtained by the conversion unit such that an intensity of the correction becomes higher for a color that is not included in the color reproduction range of the printing apparatus than for a color included in the color reproduction range of the printing apparatus.

According to another aspect of the present invention, there is provided an image processing method comprising: obtaining a luminance of an input image having a color reproduction range wider than that of a printing apparatus; performing, for the input image, conversion processing of obtaining a value included in the color reproduction range of the printing apparatus and obtaining the luminance of the image after the conversion; and correcting the luminance of the input image to suppress lowering of a contrast of the input image, wherein in the correcting, a high-frequency component of the image is corrected based on a luminance of a low-frequency component of the image such that a luminance of the high-frequency component of the image after the conversion processing is included in a luminance range of the image after the correction in the correcting.

According to another aspect of the present invention, there is provided a non-transitory computer-readable medium storing a program that causes a computer to function as: an obtaining unit configured to obtain a luminance of an input image having a color reproduction range wider than that of a printing apparatus; a conversion unit configured to perform, for the input image, conversion processing of obtaining a value included in the color reproduction range of the printing apparatus and obtaining the luminance of the image after the conversion; and a correction unit configured to correct the luminance of the input image to suppress lowering of a contrast of the input image, wherein the correction unit corrects a high-frequency component of the image based on a luminance of a low-frequency component of the image such that a luminance of the high-frequency component of the image after the conversion processing is included in a luminance range of the image after the correction by the correction unit.

According to the present invention, it is possible to provide contrast correction considering lowering of a contrast caused by the difference in the color reproduction range between an input and an output.

Further features of the present invention will become apparent from the following description of exemplary embodiments (with reference to the attached drawings).

DESCRIPTION OF THE EMBODIMENTS

First Embodiment

[System Arrangement]

Figure 3:
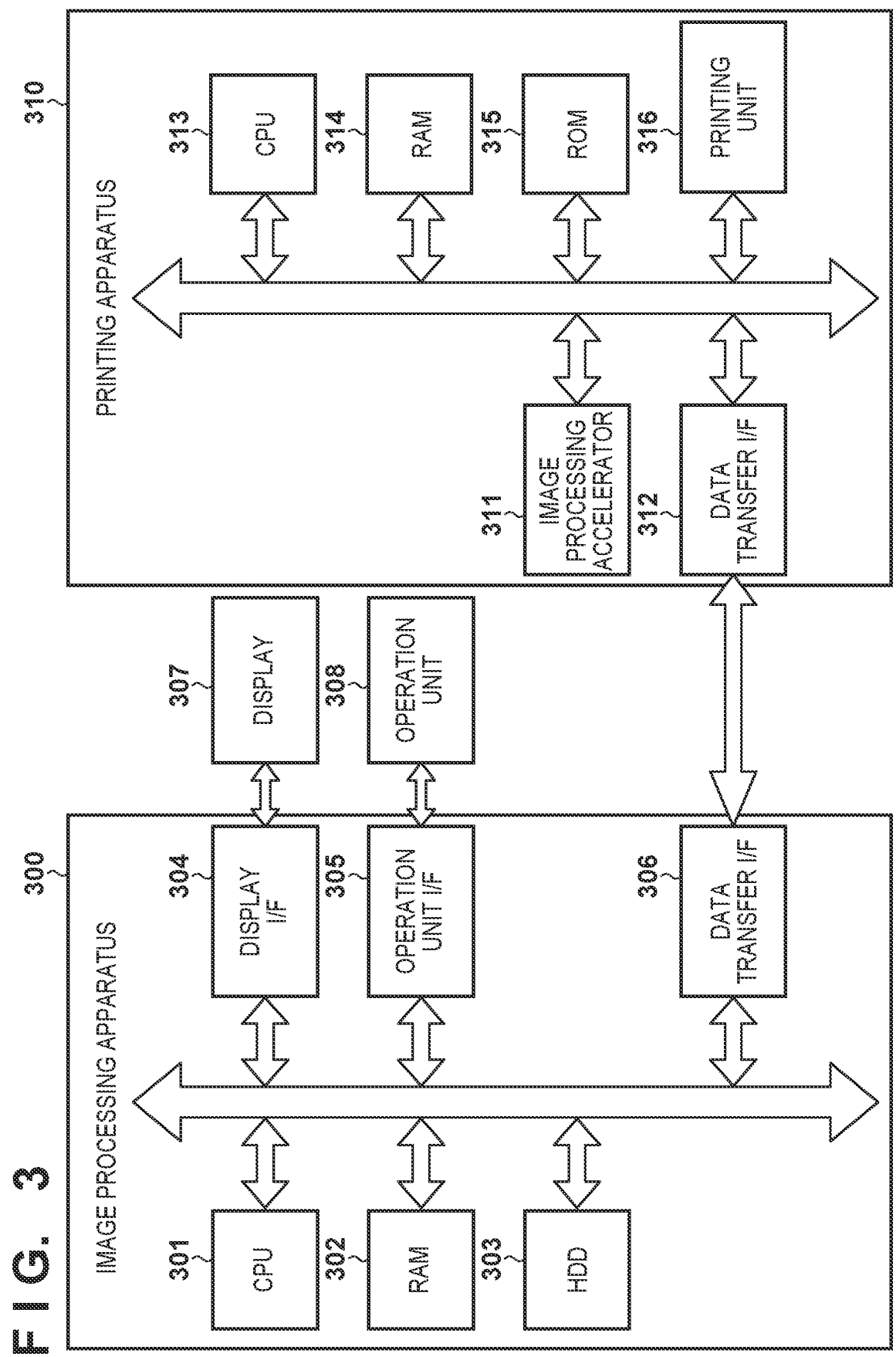
FIG. 3 is a block diagram showing an example of the hardware arrangement of a system according to the present invention.

FIG. 3 is a block diagram showing an example of the arrangement of a system to which the present invention can be applied. The system includes an image processing apparatus 300 and a printing apparatus 310. The image processing apparatus 300 is formed by a host PC functioning as an information processing apparatus, or the like. The image processing apparatus 300 includes a CPU 301, a RAM 302, an HDD 303, a display I/F 304, an operation unit I/F 305, and a data transfer I/F 306, and these components are communicably connected via an internal bus.

The CPU 301 executes various kinds of processing using the RAM 302 as a work area in accordance with a program held by the HDD 303. The RAM 302 is a volatile storage area, and is used as a work memory or the like. The HDD 303 is a nonvolatile storage area, and holds a program according to this embodiment, an OS (Operating System), and the like. The display I/F 304 is an interface configured to perform data transmission/reception between a display 307 and the main body of the image processing apparatus 300. The operation unit I/F 305 is an interface configured to input an instruction input using an operation unit 308 such as a keyboard or a mouse to the main body of the image processing apparatus 300. The data transfer I/F 306 is an interface configured to transmit/receive data to/from an external apparatus.

For example, the CPU 301 generates image data printable by the printing apparatus 310 in accordance with an instruction (a command or the like) input by a user using the operation unit 308 or a program held by the HDD 303, and transfers the image data to the printing apparatus 310. In addition, the CPU 301 performs predetermined processing for image data received from the printing apparatus 310 via the data transfer I/F 306 in accordance with a program stored in the HDD 303, and displays the result or various kinds of information on the display 307.

The printing apparatus 310 includes an image processing accelerator 311, a data transfer I/F 312, a CPU 313, a RAM 314, a ROM 315, and a printing unit 316, and these components are communicably connected via an internal bus. Note that the printing method of the printing apparatus 310 is not particularly limited. For example, an inkjet printing apparatus may be used, or an electrophotographic printing apparatus may be used. The following description will be made using an inkjet printing apparatus as an example.

The CPU 313 executes various kinds of processing using the RAM 314 as a work area in accordance with a program held by the ROM 315. The RAM 314 is a volatile storage area, and is used as a work memory or the like. The ROM 315 is a nonvolatile storage area, and holds a program according to this embodiment, an OS (Operating System), and the like. The data transfer I/F 312 is an interface configured to transmit/receive data to/from an external apparatus. The image processing accelerator 311 is hardware capable of executing image processing at a speed higher than that of the CPU 313. When the CPU 313 writes parameters and data necessary for image processing to a predetermined address of the RAM 314, the image processing accelerator 311 is activated. After the parameters and the data are loaded, predetermined image processing is executed for the data. However, the image processing accelerator 311 is not an indispensable element, and the equivalent processing can also be executed by the CPU 313. The printing unit 316 executes a printing operation based on an instruction from the image processing apparatus 300.

The connection method of the data transfer I/F 306 of the image processing apparatus 300 and the data transfer I/F 312 of the printing apparatus 310 is not particularly limited. For example, USB (Universal Serial Bus), IEEE 1394, or the like can be used. In addition, the connection may be wired or wireless.

[Contrast Correction]

Contrast correction according to this embodiment will be described below in detail. The contrast correction according to this embodiment is processing for performing predetermined image processing when printing HDR image data by the printing apparatus 310. As described above, in this embodiment, the color reproduction range of an input image (for example, HDR image data) and that of the printing apparatus 310 for performing printing are different, and the range of reproducible colors is wider in the input image.

Figure 4:
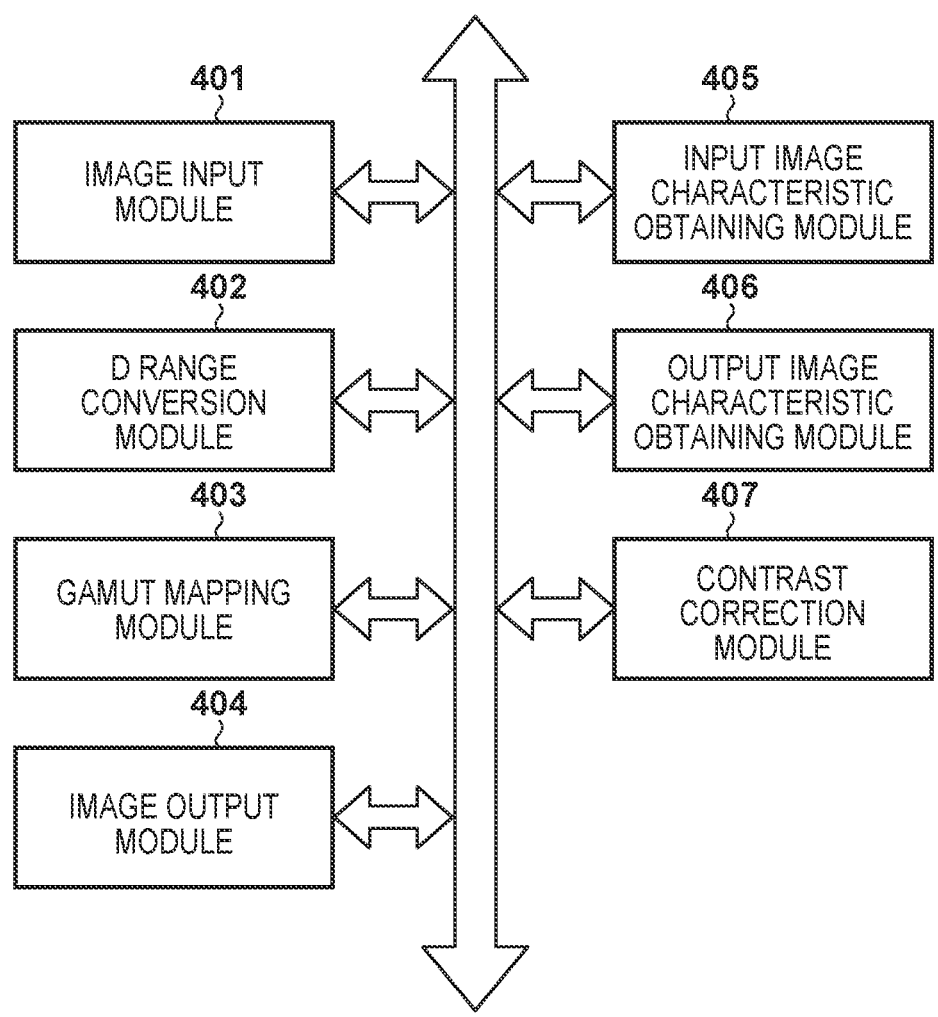
FIG. 4 is a block diagram showing an example of a software configuration concerning contrast correction according to the present invention.

FIG. 4 is a block diagram showing an example of a software configuration for performing image processing concerning contrast correction when printing HDR image data by the printing apparatus 310. In this embodiment, each module shown in FIG. 4 is implemented when the CPU 301 reads out a program stored in the HDD 303 and executes it. The image processing apparatus 300 includes an image input module 401, a D range conversion module 402, a gamut mapping module 403, an image output module 404, an input image characteristic obtaining module 405, an output image characteristic obtaining module 406, and a contrast correction module 407. Note that the modules shown here represent modules concerning processing concerning contrast correction, and the image processing apparatus 300 may further include a module configured to perform another image processing.

The image input module 401 obtains HDR image data. As for the obtaining method, image data held by the HDD 303 may be obtained, or image data may be obtained from an external apparatus via the data transfer I/F 306. In this embodiment, as HDR image data, RGB data whose D range has a peak luminance of 1,000 nit and whose color space is BT.2020 will be described as an example.

Figure 1:
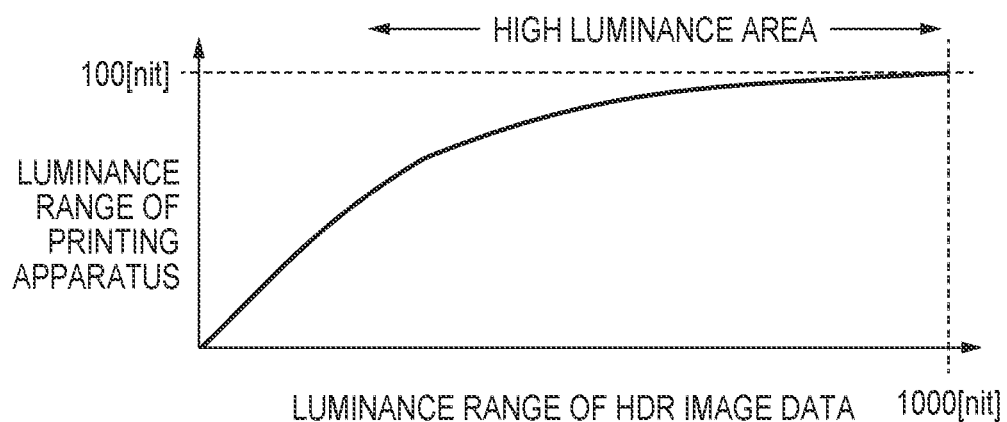
FIG. 1 is a view for explaining D range conversion.

The D range conversion module 402 performs D range compression to a predetermined luminance range for the luminance of image data input to the D range conversion module 402 using a means such as a one-dimensional lookup table (to be referred to as a 1DLUT hereinafter). In this embodiment, the D range compression is performed using a graph shown in FIG. 1. In FIG. 1, the abscissa represents the luminance of an input to be subjected to D range compression, and the ordinate represents the luminance after compression. Based on the compression characteristic shown in FIG. 1, the HDR image data having a luminance range of 1,000 nit is compressed to a luminance range of 100 nit that the printing apparatus 310 can handle.

Figure 5:
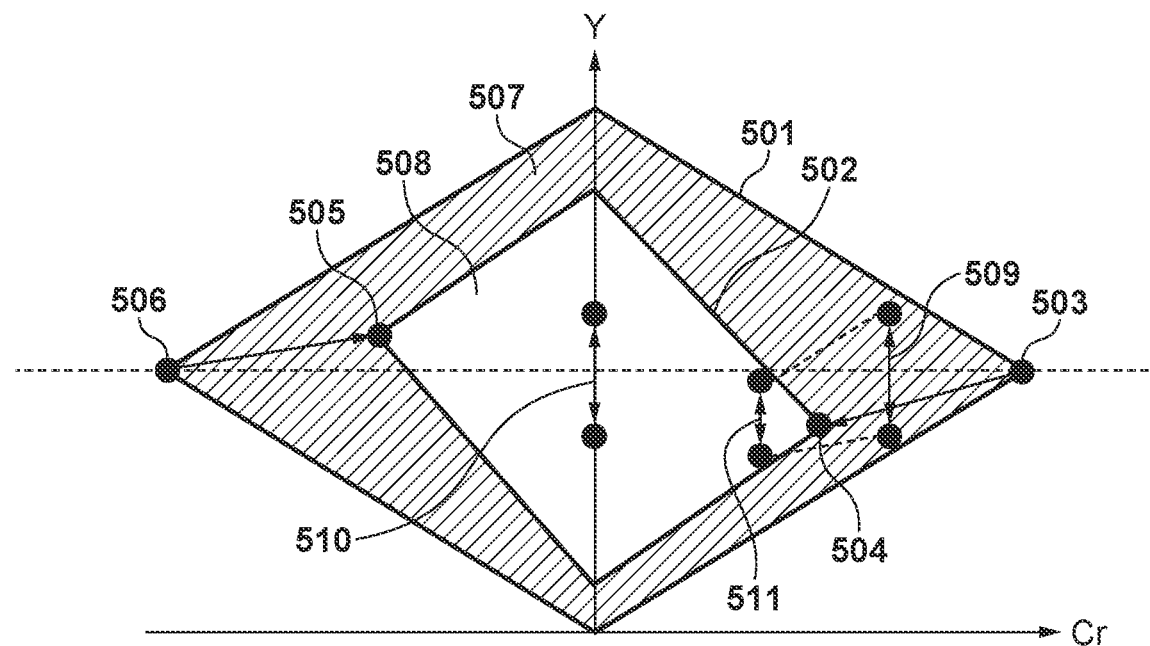
FIG. 5 is a view for explaining gamut mapping according to the present invention.

For the image data input to the gamut mapping module 403, the gamut mapping module 403 performs gamut mapping to the color gamut of the printing apparatus 310 using a method such as a three-dimensional LUT (to be referred to as a 3DLUT hereinafter). FIG. 5 is a view for explaining gamut mapping according to this embodiment. In FIG. 5, the abscissa represents Cr of the YCbCr color space, and the ordinate represents a luminance Y. An input color gamut 501 of the image data input to the gamut mapping module 403 undergoes gamut mapping to an output color gamut 502 that is the color gamut of the printing apparatus 310. When the input colors are (Y, Cb, Cr), they are converted into (Y', Cb', Cr'). If the input color has a color space different from YCbCr, the color space is converted into the YCbCr color space, and gamut mapping is then performed. In the example shown in FIG. 5, the input color gamut 501 and the output color gamut 502 do not have similar shapes.

Primary colors 503 and 506 of the input color gamut 501 are mapped to primary colors 504 and 505 of the output color gamut 502, respectively. Although the primary colors 503 and 506 have the same luminance value, the primary colors 504 and 505 after gamut mapping have different luminance values. In this way, in a case in which the input and output color gamuts in gamut mapping do not have similar shapes, even if the input luminance values are the same, the colors are mapped to different output luminance values depending on the hue.

In addition, an area 507 outside the color gamut, which is represented by hatching in FIG. 5, is a color gamut that cannot be expressed by the printing apparatus 310. The area 507 outside the color gamut is an area that is included in the input color gamut 501 but not in the output color gamut 502. On the other hand, an area 508 in the color gamut is an area included in both the input color gamut 501 and the output color gamut 502. The area 507 outside the color gamut is compressed more largely than the area 508 in the color gamut and mapped in the output color gamut 502. For example, in the input colors, a contrast 509 of two colors is mapped to a contrast 511, and a contrast 510 is mapped to the same contrast as the input even after the mapping. That is, in the contrast 510, the change before and after the mapping is smaller than in the contrast 511. In other words, the conversion characteristic is different between conversion in the area 508 in the color gamut and conversion from the area 507 outside the color gamut to the area 508 in the color gamut. Since the colors outside the output color gamut are compressed more largely than the colors in the output color gamut and mapped, the contrast becomes lower in the colors outside the output color gamut.

The input image characteristic obtaining module 405 generates (extracts) the value of the high frequency of the image data input to the image input module 401. First, the input image characteristic obtaining module 405 calculates the luminance of the input image data. If the input image data is RGB data (R: Red, G: Green, B: Blue), it can be converted into YCbCr by a method represented by equations (1) to (3). Note that the RGB-YCbCr conversion formulas shown below are merely examples, and other conversion formulas may be used. In the following formulas, "·" represents multiplication.

$$Y = 0.299 \cdot R + 0.587 \cdot G + 0.114 \cdot B \quad (1)$$

$$Cb = -0.1687 \cdot R - 0.3313 \cdot G + 0.5 \cdot B \quad (2)$$

$$Cr = 0.5 \cdot R - 0.4187 \cdot G - 0.0813 \cdot B \quad (3)$$

Figure 6:
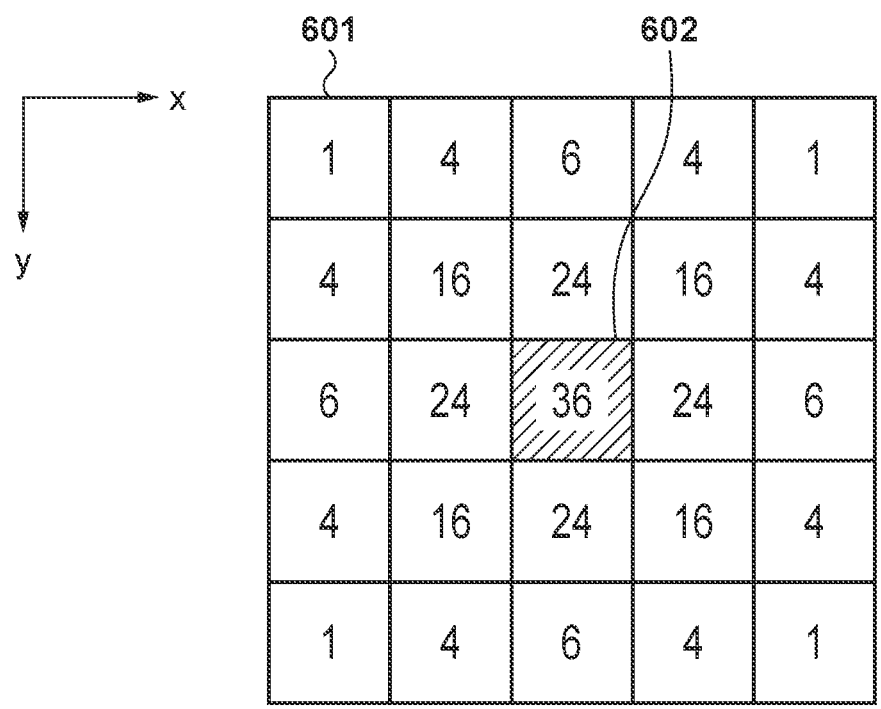
FIG. 6 is a view for explaining a Gaussian filter.

Furthermore, the input image characteristic obtaining module 405 generates the value of a high frequency from the calculated luminance (Y value). To generate the value of the high frequency, first, the value of a low frequency is calculated. The value of the low frequency is generated by performing filtering processing for the luminance. The filtering processing will be described with reference to FIG. 6 using a Gaussian filter used to perform smoothing processing as an example. In FIG. 6, the filter size is 5×5, and a coefficient 601 is set for each of the 25 pixels. Let x be the horizontal direction of the image, and y be the vertical direction. The pixel value at coordinates (x, y) is p(x, y), and the filter coefficient is f(x, y). Filtering processing is performed by a method represented by equation (4) for each pixel p'(x, y) of interest. Every time the filter scans the image data with respect to a pixel 602 of interest as the center, the calculation of equation (4) is performed. When scanning for all pixels is completed, the value of the low frequency is obtained.

$$p'(x,y) = \{1/\Sigma f(x,y)\} \cdot \Sigma \{f(x,y) \times p(x,y)\} \quad (4)$$

In this embodiment, the Gaussian type has been exemplified as the filter characteristic. However, the present invention is not limited to this. For example, an edge preservation type filter such as a bilateral filter may be used. When the edge preservation type filter is used, the halo of an artifact that occurs in an edge portion at the time of contrast correction can be reduced.

Figure 7:
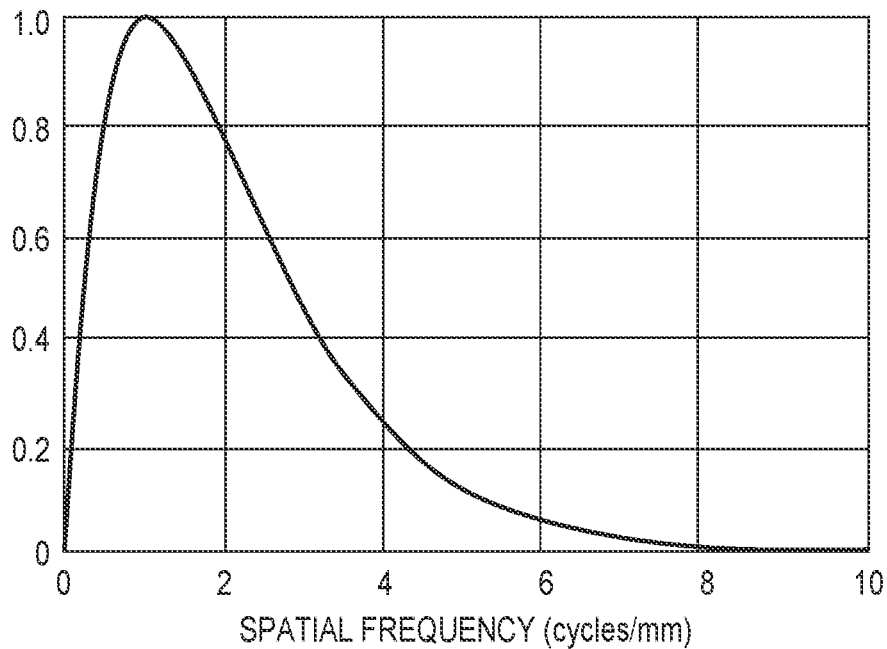
FIG. 7 is a view for explaining a visual transfer function according to the present invention.

FIG. 7 is a view showing a visual transfer function VTF for a spatial frequency. The visual transfer function VTF shown in FIG. 7 indicates that the visual sensitivity represented by the ordinate changes when the spatial frequency represented by the abscissa changes. This means that the higher the visual sensitivity is, the higher the transfer characteristic is. As can be seen from the visual transfer function VTF, a high transfer characteristic of about 0.8 or more can be obtained at a spatial frequency of 0.5 cycle/mm or more. Note that in the example shown in FIG. 7, when the spatial frequency is 2 cycles/mm or more, the visual sensitivity is lower than 0.8. The frequency that is the target of contrast correction is preferably a frequency with a high visual sensitivity. That is, the high frequency indicates 0.5 cycle/mm or more, which is a frequency including a peak sensitivity, and the low frequency indicates 0.5 cycle/mm or less. In this embodiment, a high-frequency component and a low-frequency component are obtained from the luminance based on this premise.

Let I be the luminance, H be the value of the high frequency, and L be the value of the low frequency for each pixel. The value H of the high frequency is calculated by $$H = I/L \quad (5)$$

In this embodiment, the value H of the high frequency and the value L of the low frequency of the luminance I will be described as values equal to a value Re of reflected light and a value Li of illumination light, respectively. The illumination light here means an illumination light component included in the luminance component, and the reflected light means a reflected light component included in the luminance component. That is, the description will be made using the value H of the high frequency as a value representing the intensity of the high-frequency component, and also using the value L of the low frequency as a value representing the intensity of the low-frequency component.

The value of the illumination light can be generated by performing filtering processing, like the value of the low frequency. In addition, when an edge preservation type filter is used, the value of illumination light at an edge portion can more accurately be generated. The value Re of the reflected light and the value Li of the illumination light can be given by $$Re = I/Li \quad (6)$$

The value H of the high frequency is generated by dividing the input image by the value of the low frequency, as indicated by equation (5). However, the present invention is not limited to this. For example, the value H of the high frequency may be generated by subtracting the value of the low frequency from the input image, as indicated by equation (7). This also applies to a case in which the value of the reflected light and the value of the illumination light are used.

$$H = I - L \quad (7)$$

The output image characteristic obtaining module 406 generates the value of the high frequency of the color system to be output by the printing apparatus 310. That is, the output image characteristic obtaining module 406 obtains the value of the high frequency within the range of the color system that can be reproduced by the printing apparatus 310. The generation method will be described later with reference to the flowchart of FIG. 8.

The contrast correction module 407 decides the contrast correction intensity based on the values of the high frequencies generated by the input image characteristic obtaining module 405 and the output image characteristic obtaining module 406, and performs contrast correction processing for the value of the high frequency of the image data input to the contrast correction module 407. In this embodiment, the description will be made assuming that the contrast of the image is corrected by correcting the intensity of the value of the high frequency. The correction method will be described later with reference to the flowchart of FIG. 9.

The image output module 404 performs image processing for output by the printing apparatus 310. The image data that has undergone the gamut mapping by the gamut mapping module 403 is separated into ink colors to be printed by the printing apparatus 310. The image output module 404 further performs desired image processing needed for the output by the printing apparatus 310, for example, quantization processing of converting the image data into binary data representing ink discharge/non-discharge using dither or error diffusion processing.

(High Frequency Generation Processing)

Figure 8:
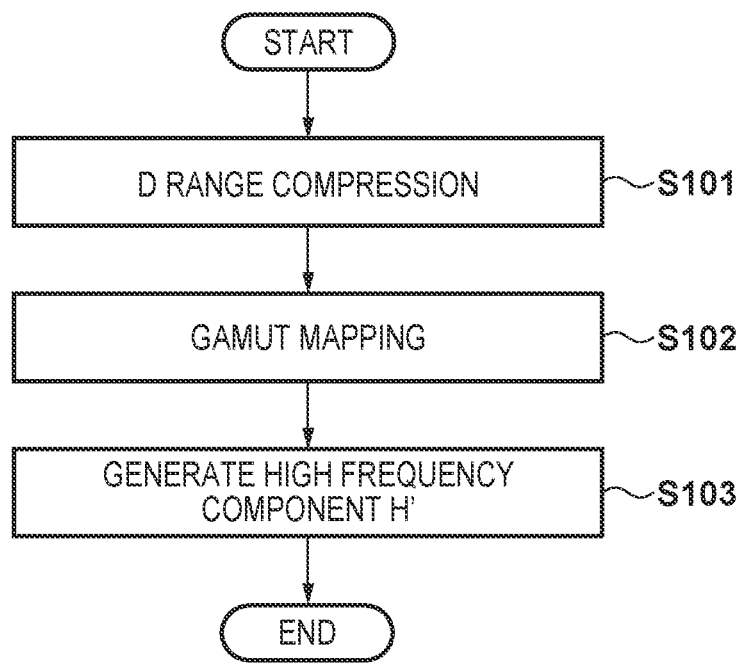
FIG. 8 is a flowchart showing the processing of an output image characteristic obtaining module according to the present invention.

Details of the processing of generating the high frequency of the color system to be output by the printing apparatus 310, which is performed by the output image characteristic obtaining module 406, will be described with reference to FIG. 8.

In step S101, the output image characteristic obtaining module 406 causes the D range conversion module 402 to perform D range conversion for image data input to the image input module 401.

In step S102, the output image characteristic obtaining module 406 causes the gamut mapping module 403 to perform gamut mapping for the image data that has undergone the D range compression in step S101.

In step S103, the output image characteristic obtaining module 406 generates a value H' of a high frequency from the image data that has undergone the gamut mapping in step S102. To generate the value of the high frequency, the output image characteristic obtaining module 406 calculates the luminance, and further calculates the value of the low frequency of the calculated luminance, like the input image characteristic obtaining module 405. The output image characteristic obtaining module 406 calculates the value of the high frequency in accordance with equation (5) based on the value of the low frequency and the input luminance. The processing procedure is then ended.

Figure 10:
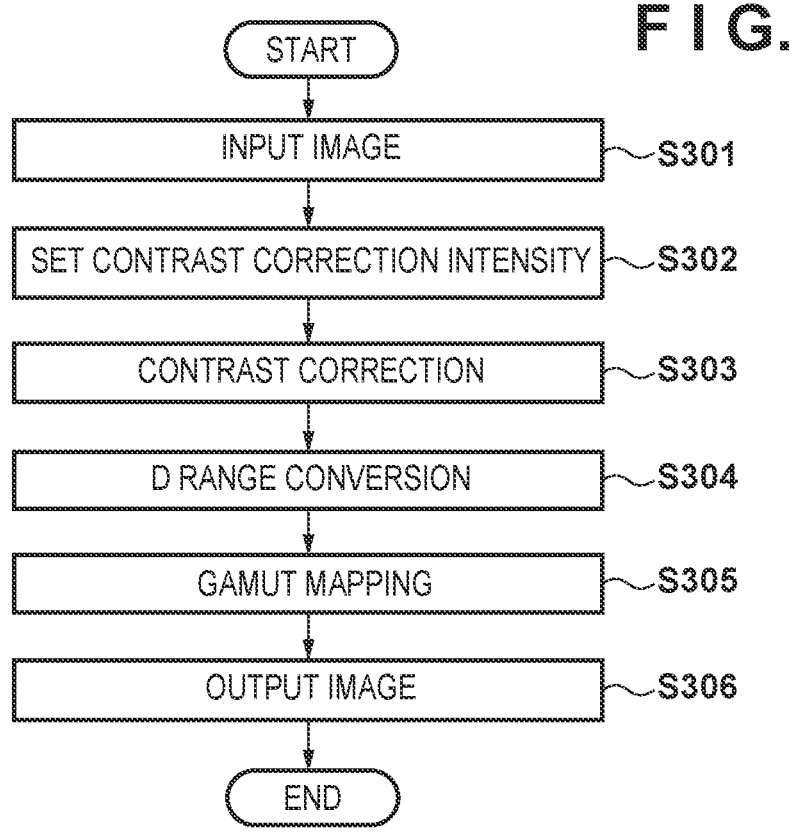
FIG. 10 is a flowchart showing a contrast correction method according to the first embodiment.

The D range compression processing and the gamut mapping processing here have the same contents as D range conversion and gamut mapping processing performed in processing shown in FIG. 10 to be described later, but are executed for a different purpose. Note that the D range compression processing and the gamut mapping processing will sometimes be referred to as conversion processing together in the following explanation.

(Contrast Correction Processing)

Details of the contrast processing by the contrast correction module 407 will be described with reference to FIG. 9.

In step S201, the contrast correction module 407 converts the input image data into YCbCr color space. If the input color space is the RGB color space, the RGB color space is converted into the YCbCr color space in accordance with equations (1) to (3).

In step S202, the contrast correction module 407 obtains the luminance value I from the data of the YCbCr color space generated in step S201, and calculates the value H of the high frequency and the value L of the low frequency based on the luminance value. Here, the calculation methods of the value H of the high frequency and the value L of the low frequency are similar to those of the input image characteristic obtaining module 405 and the output image characteristic obtaining module 406 described above. That is, the contrast correction module 407 calculates the value L of the low frequency of the luminance, and calculates the value H of the high frequency in accordance with equation (5) based on the calculated value L of the low frequency and the input luminance value I.

In step S203, the contrast correction module 407 generates the contrast correction intensity based on the values of the high frequencies generated by the input image characteristic obtaining module 405 and the output image characteristic obtaining module 406. Here, the target value of the contrast intensity is set to the value of the high frequency of the input image. Let Hm be the correction intensity calculated as the correction coefficient used when performing contrast correction, Ht be the value of the high frequency generated by the input image characteristic obtaining module 405, and H' be the value of the high frequency generated by the output image characteristic obtaining module 406. At this time, the correction intensity calculation method can be represented by $$Hm=Ht/H' \tag{8}$$

Equation (8) represents the reverse bias when the intensity of the value of the high frequency changes from the input image to the output image.

The value obtained here is the reverse bias before and after the conversion. For this reason, in the example shown in FIG. 5, the correction intensity in the area 507 outside the color gamut is set to be higher than the correction intensity in the area 508 in the color gamut. This is because the degree of change (degree of compression) in the conversion is different, as described using the contrast 510 and the contrasts 509 and 511.

Note that when the value Ht of the high frequency and the value H' of the high frequency are generated using equation (7), the correction intensity Hm can be given by $$Hm=Ht-H' \tag{9}$$

Equation (9) represents the difference when the intensity of the value of the high frequency changes from the input image to the output image.

In step S204, the contrast correction module 407 performs contrast correction by multiplying the value H of the high frequency generated in step S202 by the correction intensity Hm. That is, contrast correction is performed for the value of the high frequency of the input image data. Letting Hc be the value of the high frequency after the contrast correction, contrast correction can be represented by $$Hc=Hm \times H \tag{10}$$

Note that when the value H of the high frequency is generated using equation (7), contrast correction is performed by adding the correction intensity Hm to the value H of the high frequency generated in step S202. The value Hc of the high frequency after the contrast correction is given by $$Hc=Hm+H \tag{11}$$

As represented by equations (8) and (9), the contrast lowers from the input image to the output image, that is, the reverse bias amount when the intensity of the value of the high frequency lowers is set to the correction intensity Hm. When correction is performed by multiplication of the reverse bias amount by equation (10) or addition of the reverse bias amount by equation (11), the intensity of the value of the high frequency of the input image can be maintained in the output image, or a value close to the intensity of the value of the high frequency of the input image can be obtained in the output image.

In step S205, the contrast correction module 407 combines the value Hc of the high frequency after the contrast correction in step S204, the value L of the low frequency calculated in step S202, and the value Cb and Cr generated in step S201 to obtain the original RGB data. First, the contrast correction module 407 integrates the value Hc of the high frequency after the contrast correction and the value L of the low frequency by equation (12), thereby obtaining a luminance I' after the contrast correction by combining the values of the frequencies.

$$I'=Hc \times L \tag{12}$$

Note that when the value Hc of the high frequency and the value L of the low frequency are generated using equation (7), the luminance I' can be given by $$I'=Hc+L \tag{13}$$

The contrast correction module 407 then plane-combines the luminance I' and the color difference values (Cb, Cr) to generate color image values (I', Cb, Cr). The image that has undergone the contrast correction according to this embodiment is thus obtained. The processing procedure is then ended.

[Processing Procedure]

The flowchart of the overall processing according to this embodiment will be described with reference to FIG. 10. This processing procedure is implemented when, for example, the CPU 301 reads out and executes a program stored in the HDD 303 and thus functions as each processing unit shown in FIG. 4.

In step S301, the image input module 401 obtains HDR image data. As for the obtaining method, image data held by the HDD 303 may be obtained, or image data may be obtained from an external apparatus via the data transfer I/F 306. In addition, the HDR image data of the obtaining target may be decided based on selection or instruction of the user.

In step S302, the contrast correction module 407 generates the contrast correction intensity Hm by the method described above with reference to FIG. 9 using the values of the high frequencies generated by the input image characteristic obtaining module 405 and the output image characteristic obtaining module 406.

In step S303, the contrast correction module 407 performs, for the value of the high frequency of the image data input in step S301, contrast correction by the method described above with reference to FIG. 9 using the contrast correction intensity Hm generated in step S302. That is, steps S303 and S304 of this processing procedure correspond to the processing shown in FIG. 9.

In step S304, the D range conversion module 402 performs D range conversion (dynamic range compression processing) by the method described above with reference to FIG. 1 and the like for the image data that has undergone the contrast correction in step S303. In this embodiment, the D range conversion module 402 converts the D range from 1,000 nit of the input image to 100 nit that is the D range for gamut mapping.

In step S305, the gamut mapping module 403 performs gamut mapping processing by the method described above with reference to FIG. 5 and the like for the image data that has undergone the D range conversion in step S304.

In step S306, the image output module 404 executes output processing for output by the printing apparatus 310 by the above-described method for the image data that has undergone the gamut mapping in step S305. The processing procedure is then ended.

In this embodiment, using the value of the high frequency of the input image and the value of the high frequency of the output image after gamut mapping, contrast correction is performed by setting the reverse bias amount corresponding to the decrease amount of the value of the high frequency to the correction intensity. Accordingly, even in a case in which the value of the high frequency lowers due to the D range conversion in step S304 and the gamut mapping in step S305, which are performed after the correction intensity is set, the decrease amount is corrected in advance by the contrast correction. As a result, even after the gamut mapping, the contrast of the input image can be maintained, or the contrast can be made close to that.

In addition, when the value of the high frequency of the output image after the gamut mapping is used at the time of generation of the contrast correction intensity, the correction intensity can be decided in a state in which the decrease amount of the contrast due to compression of gamut mapping is included. Hence, as the ratio of compression by gamut mapping rises, the contrast correction intensity can be set high. Additionally, the value of the high frequency that has undergone the contrast correction is close to the value of the high frequency of the input image, and the value of the low frequency that has not undergone the contrast correction is close to the value of the low frequency after the gamut mapping.

As is apparent from the above description, according to this embodiment, it is possible to suppress lowering of the contrast caused by the difference in the color reproduction range between the input and the output.

Note that in this embodiment, an example in which the YCbCr color space is used as a luminance has been described. However, an xyz color space representing a luminance and chromaticity may be used.

Second Embodiment

Figure 11:
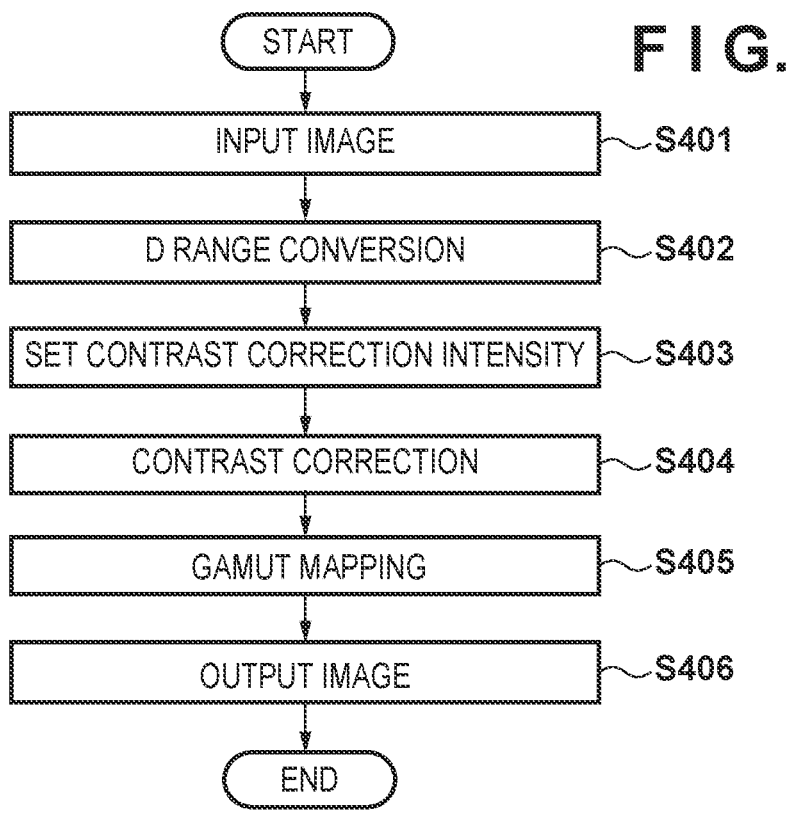
FIG. 11 is a flowchart showing a contrast correction method according to the second embodiment.

The second embodiment of the present invention will be described with reference to the flowchart of FIG. 11. A description of portions that overlap the first embodiment will be omitted, and only differences will be described. In this embodiment, contrast correction is performed after D range conversion, unlike FIG. 10 described in the first embodiment. That is, the order of processing steps is different from the first embodiment.

In step S401, an image input module 401 obtains HDR image data. As for the obtaining method, image data held by an HDD 303 may be obtained, or image data may be obtained from an external apparatus via a data transfer I/F 306. In addition, the HDR image data of the obtaining target may be decided based on selection or instruction of the user.

In step S402, a D range conversion module 402 performs D range conversion by the method described above with reference to FIG. 1 and the like for the image data input in step S401. In this embodiment, the D range conversion module 402 converts the D range from 1,000 nit of the input image to 100 nit that is the D range for gamut mapping.

In step S403, a contrast correction module 407 generates a contrast correction intensity Hm by the method described above with reference to FIG. 9 using the values of high frequencies generated by an input image characteristic obtaining module 405 and an output image characteristic obtaining module 406.

In step S404, the contrast correction module 407 performs, for the value of the high frequency of the image data that has undergone the D range conversion in step S402, contrast correction by the method described above with reference to FIG. 9 using the contrast correction intensity Hm generated in step S403. That is, steps S403 and S404 of this processing procedure correspond to the processing shown in FIG. 9 described in the first embodiment.

In step S405, a gamut mapping module 403 performs gamut mapping by the method described above with reference to FIG. 5 and the like for the image data that has undergone the contrast correction in step S404.

In step S406, an image output module 404 executes output processing for output by a printing apparatus 310 by the above-described method for the image data that has undergone the gamut mapping in step S405. The processing procedure is then ended.

In this embodiment, using the value of the high frequency of the input image and the value of the high frequency of the output image after gamut mapping, contrast correction is performed by setting the reverse bias amount corresponding to the decrease amount of the value of the high frequency to the correction intensity. Hence, even in a case in which the value of the high frequency lowers due to the D range conversion in step S402 and the gamut mapping in step S405, the decrease amount is corrected by the contrast correction. As a result, even after the gamut mapping, the contrast of the input image can be maintained, or the contrast can be made close to that.

In addition, when the value of the high frequency of the output image after the gamut mapping is used at the time of generation of the contrast correction intensity, the correction intensity can be decided in a state in which the decrease amount of the contrast due to compression of gamut mapping is included. Hence, as the ratio of compression by gamut mapping rises, the contrast correction intensity can be set high. Additionally, the value of the high frequency that has undergone the contrast correction is close to the value of the high frequency of the input image, and the value of the low frequency that has not undergone the contrast correction is close to the value of the low frequency after the gamut mapping.

Furthermore, since the contrast correction is performed after the D range conversion, the memory used for the processing can be made small because the D range is small as compared to a case in which the correction is performed before the D range conversion.

Third Embodiment

Figure 12:
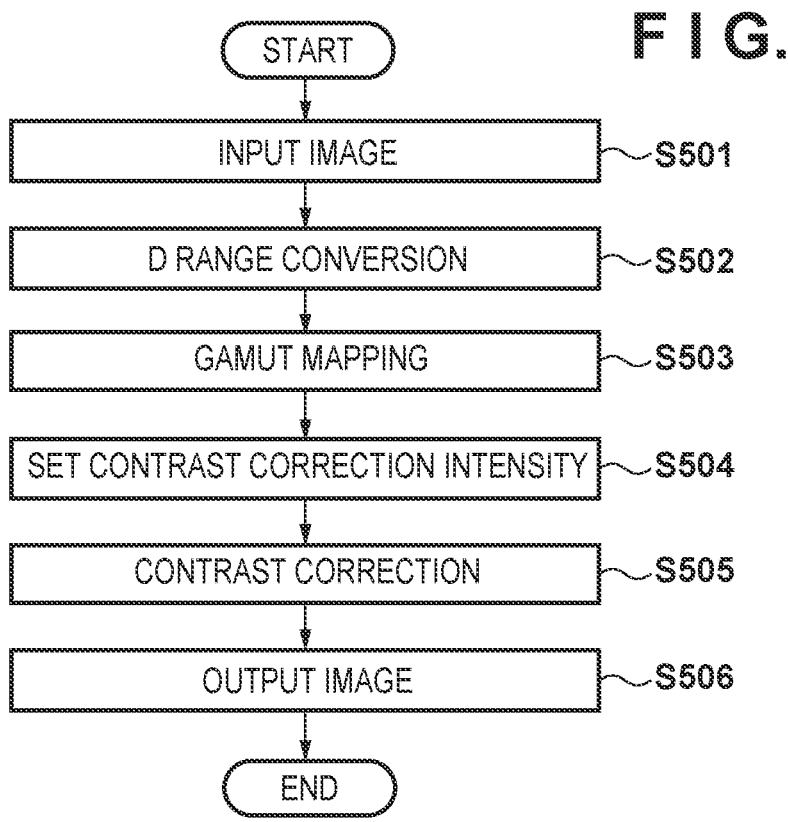
FIG. 12 is a flowchart showing a contrast correction method according to the third embodiment.

The third embodiment of the present invention will be described with reference to the flowchart of FIG. 12. A description of portions that overlap the first embodiment will be omitted, and only differences will be described. In this embodiment, contrast correction is performed after D range conversion and gamut mapping, unlike FIG. 10 described in the first embodiment. That is, the order of processing steps is different from the first embodiment.

In step S501, an image input module 401 obtains HDR image data. As for the obtaining method, image data held by an HDD 303 may be obtained, or image data may be obtained from an external apparatus via a data transfer I/F 306. In addition, the HDR image data of the obtaining target may be decided based on selection or instruction of the user.

In step S502, a D range conversion module 402 performs D range conversion by the method described above with reference to FIG. 1 and the like for the image data input in step S501. In this embodiment, the D range conversion module 402 converts the D range from 1,000 nit of the input image to 100 nit that is the D range for gamut mapping.

In step S503, a gamut mapping module 403 performs gamut mapping by the method described above with reference to FIG. 5 and the like for the image data that has undergone the D range conversion in step S502.

In step S504, a contrast correction module 407 generates a contrast correction intensity Hm by the method described above with reference to FIG. 9 using the values of high frequencies generated by an input image characteristic obtaining module 405 and an output image characteristic obtaining module 406.

In step S505, the contrast correction module 407 performs, for the value of the high frequency of the image data that has undergone the gamut mapping in step S503, contrast correction by the method described above with reference to FIG. 9 using the contrast correction intensity Hm generated in step S504. That is, steps S504 and S505 of this processing procedure correspond to the processing shown in FIG. 9 described in the first embodiment.

In step S506, an image output module 404 executes output processing for output by a printing apparatus 310 by the above-described method for the image data that has undergone the contrast correction in step S505. The processing procedure is then ended.

In this embodiment, using the value of the high frequency of the input image and the value of the high frequency of the output image after gamut mapping, contrast correction is performed by setting the reverse bias amount corresponding to the decrease amount of the value of the high frequency to the correction intensity. Hence, even in a case in which the value of the high frequency lowers due to the D range conversion in step S502 and the gamut mapping in step S503, the decrease amount is corrected by the contrast correction. As a result, even after the gamut mapping, the contrast of the input image can be maintained, or the contrast can be made close to that.

In addition, when the value of the high frequency of the output image after the gamut mapping is used at the time of generation of the contrast correction intensity, the correction intensity can be decided in a state in which the decrease amount of the contrast due to compression of gamut mapping is included. Hence, as the ratio of compression by gamut mapping rises, the contrast correction intensity can be set high. Additionally, the value of the high frequency that has undergone the contrast correction is close to the value of the high frequency of the input image, and the value of the low frequency that has not undergone the contrast correction is close to the value of the low frequency after the gamut mapping.

Furthermore, since the contrast correction is performed after the gamut mapping, the memory used for the processing can be made small because the D range is small as compared to a case in which the correction is performed before the D range conversion.

Fourth Embodiment

Figure 13:
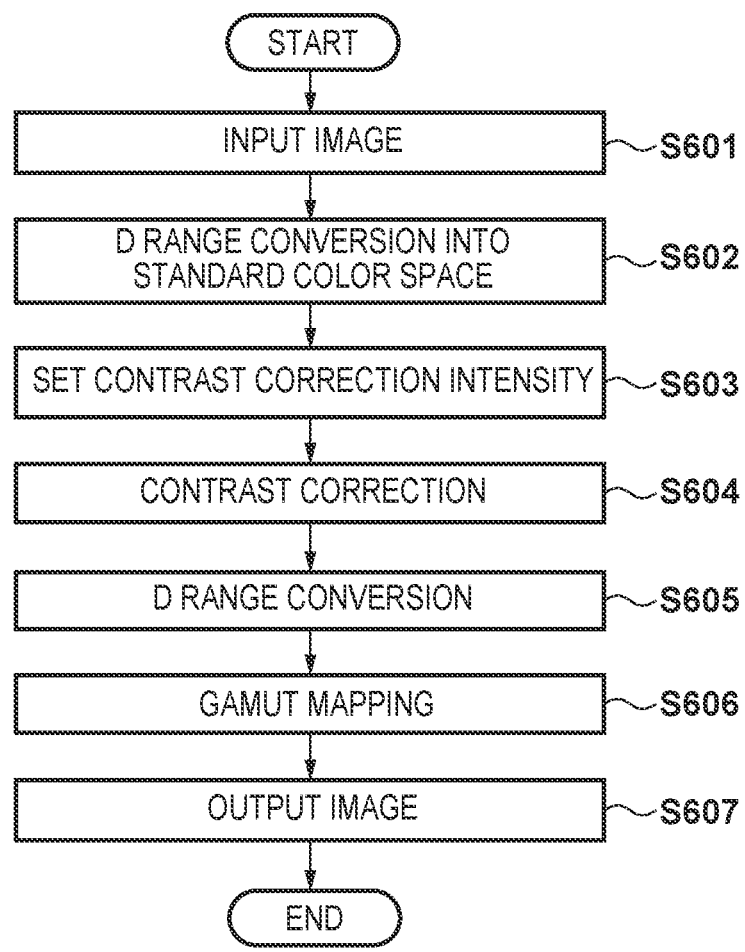
FIG. 13 is a flowchart showing a contrast correction method according to the fourth embodiment.

The fourth embodiment of the present invention will be described with reference to the flowchart of FIG. 13. A description of portions that overlap the first embodiment will be omitted, and only differences will be described. In this embodiment, D range conversion is performed twice, unlike FIG. 10 described in the first embodiment.

In step S601, an image input module 401 obtains HDR image data. As for the obtaining method, image data held by an HDD 303 may be obtained, or image data may be obtained from an external apparatus via a data transfer I/F 306. In addition, the HDR image data of the obtaining target may be decided based on selection or instruction of the user.

In step S602, a D range conversion module 402 performs D range conversion by the method described above with reference to FIG. 1 and the like for the image data input in step S601. In this embodiment, the D range conversion module 402 converts the D range from 1,000 nit of the input image to the D range of a color space used as a standard. For example, in a case of AdobeRGB, the D range of the input image is converted to 120 nit.

In step S603, a contrast correction module 407 generates a contrast correction intensity Hm by the method described above with reference to FIG. 9 using the values of high frequencies generated by an input image characteristic obtaining module 405 and an output image characteristic obtaining module 406.

In step S604, the contrast correction module 407 performs, for the value of the high frequency of the image data converted into the D range of the standard color space in step S602, contrast correction by the method described above with reference to FIG. 9 using the contrast correction intensity Hm generated in step S603. That is, steps S603 and S604 of this processing procedure correspond to the processing shown in FIG. 9 described in the first embodiment.

In step S605, the D range conversion module 402 performs D range conversion by the method described above with reference to FIG. 1 and the like for the image data that has undergone the contrast correction in step S604. In this embodiment, the D range of the image is converted from 120 nit of the standard color space converted in step S602 to 100 nit that is the D range for gamut mapping.

In step S606, a gamut mapping module 403 performs gamut mapping by the method described above with reference to FIG. 5 and the like for the image data that has undergone the D range conversion in step S605.

In step S607, an image output module 404 executes output processing for output by a printing apparatus 310 by the above-described method for the image data that has undergone the gamut mapping in step S606. The processing procedure is then ended.

In this embodiment, using the value of the high frequency of the input image and the value of the high frequency of the output image after gamut mapping, contrast correction is performed by setting the reverse bias amount corresponding to the decrease amount of the value of the high frequency to the correction intensity. Hence, even in a case in which the value of the high frequency lowers due to the D range conversion to the standard color space in step S602, the D range conversion in step S605, and the gamut mapping in step S606, the decrease amount is corrected by the contrast correction. As a result, even after the gamut mapping, the contrast of the input image can be maintained, or the contrast can be made close to that.

In addition, when the value of the high frequency of the output image after the gamut mapping is used at the time of generation of the contrast correction intensity, the correction intensity can be decided in a state in which the decrease amount of the contrast due to compression of gamut mapping is included. Hence, as the ratio of compression by gamut mapping rises, the contrast correction intensity can be set high. Additionally, the value of the high frequency that has undergone the contrast correction is close to the value of the high frequency of the input image, and the value of the low frequency that has not undergone the contrast correction is close to the value of the low frequency after the gamut mapping.

Furthermore, since the D range is temporarily converted into the D range of the standard color space, an editing operation such as retouch can be performed while confirming the image in an environment independent of the printing apparatus, for example, on an HDR monitor.

Fifth Embodiment

Figures 14, 15:
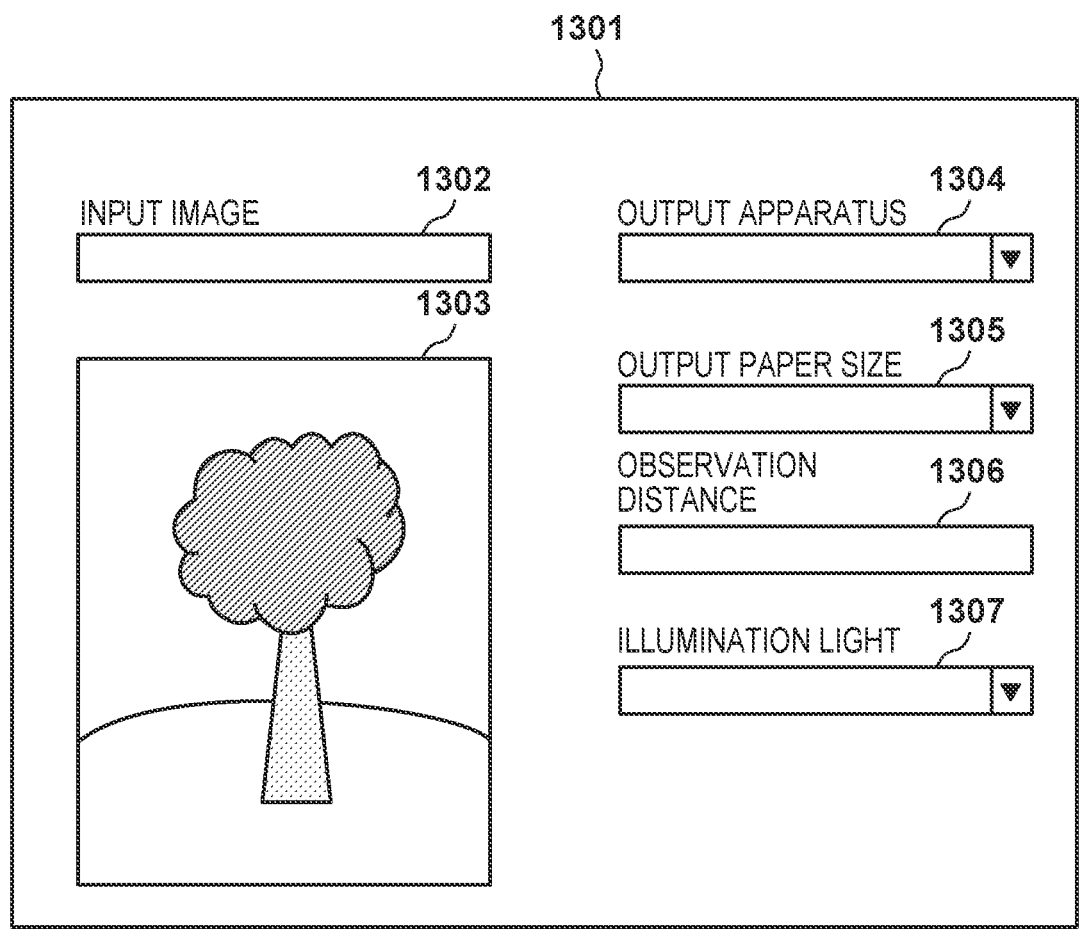
FIG. 14 is a view for explaining a correction intensity generation method according to the fifth embodiment.
FIG. 15 is a schematic view of an example of a UI configuration screen according to the sixth embodiment.

In the above embodiments, the description has been made using the example in which the contrast correction intensity is generated from the value of the high frequency of the input image and the value of the high frequency of the output image. In this embodiment, an example in which correction intensity information is generated by a 3D LUT method will be described. FIG. 14 is a view for explaining generation of correction intensity information according to this embodiment.

In this embodiment, correction intensity information sets the decrease amount of the contrast between the input image and the output image to the reverse bias. The output image is assumed to be in a state in which the input image has undergone D range compression and also gamut mapping. In FIG. 14, the reference color (224, 0, 0) and the contrast target color (232, 8, 8) of the input change to (220, 8, 8) and (216, 12, 12), respectively, by the D range compression and the gamut mapping. Difference values ΔRGB representing the contrast between the reference color and the contrast target color in the input and the output are 13.9 and 6.9, and the reverse bias of the contrast ratio is calculated by equation (14). In addition, the reverse bias of the contrast difference can be calculated by equation (15).

$$13.9/6.9 = 2.0 \quad (14)$$

$$13.9 - 6.9 = 7.0 \quad (15)$$

By the above method, the correction intensity for the input color is generated. This is calculated for each grid value of a 3D LUT, thereby generating a 3D LUT representing a correction intensity Hm of the output for the input (R, G, B). In this way, it is possible to generate correction intensity information having a characteristic that makes the correction intensity Hm larger for a color outside the color gamut compressed largely by gamut mapping than for a color in the color gamut for which the compression is small.

A method of performing contrast correction using the correction intensity information will be described. A contrast correction module 407 looks up the 3D LUT of the correction intensity information using the RGB values of input image data, thereby generating the correction intensity Hm for the input color. Furthermore, the contrast correction module 407 performs contrast correction using the generated correction intensity Hm.

In this embodiment, using the input image and the output image after gamut mapping, the contrast correction is performed using the correction intensity information of the 3D LUT that sets the reverse bias amount corresponding to the decrease amount of the contrast to the correction intensity. Hence, even if the contrast lowers due to the D range conversion and the gamut mapping, the decrease amount is corrected. For this reason, even after the gamut mapping, the contrast of the input image can be maintained, or the contrast can be made close to that. In addition, since the correction intensity Hm is generated by the 3D LUT method, the value of the high frequency of the input image and the value of the high frequency of the output image need not be calculated, and the contrast correction can be performed in a small memory state.

Sixth Embodiment

As the sixth embodiment of the present invention, a form that holds the effect of contrast correction considering an observation condition will be described. Note that a description of components that overlap the above embodiments will appropriately be omitted, and a description will be made with focus placed on differences.

As described above, the contrast intensity lowers at the time of printing by a printing apparatus due to compression by gamut mapping. Additionally, since the contrast sensitivity characteristic changes depending on the observation condition, it is difficult to hold the effect of contrast correction. This embodiment aims at solving this problem.

[Screen Arrangement]

FIG. 15 shows a UI configuration screen 1301 provided by a contrast correction application according to this embodiment, which is displayed on a display 307. The user can set a contrast correction condition to be described later via the UI configuration screen 1301 that is a display screen. The user designates, in a path box 1302 of the UI configuration screen 1301, the storage location (path) of an image to be subjected to contrast correction. The image designated by the path box 1302 is displayed in an input image display portion 1303. In an output apparatus setting box 1304, an apparatus that outputs the image designated by the path box 1302 is selected from a pull-down menu and set. In an output paper size setting box 1305, a paper size to be output is selected from a pull-down menu and set. Note that in addition to predetermined sizes, the user may input an arbitrary size from an operation unit 308 and set. In an observation distance setting box 1306, a distance to observe an output printed product is input from the operation unit 308 and set. An appropriate observation distance may automatically be calculated and set based on the output paper size set in the output paper size setting box 1305. Conversely, an appropriate output paper size may automatically be calculated and set based on the observation distance set in the observation distance setting box 1306. In an illumination light setting box 1307, the luminance value of illumination light made to strike the output printed product is selected from a pull-down menu and set. The luminance value may be input from the operation unit 308.

[Software Configuration]

Figure 16:
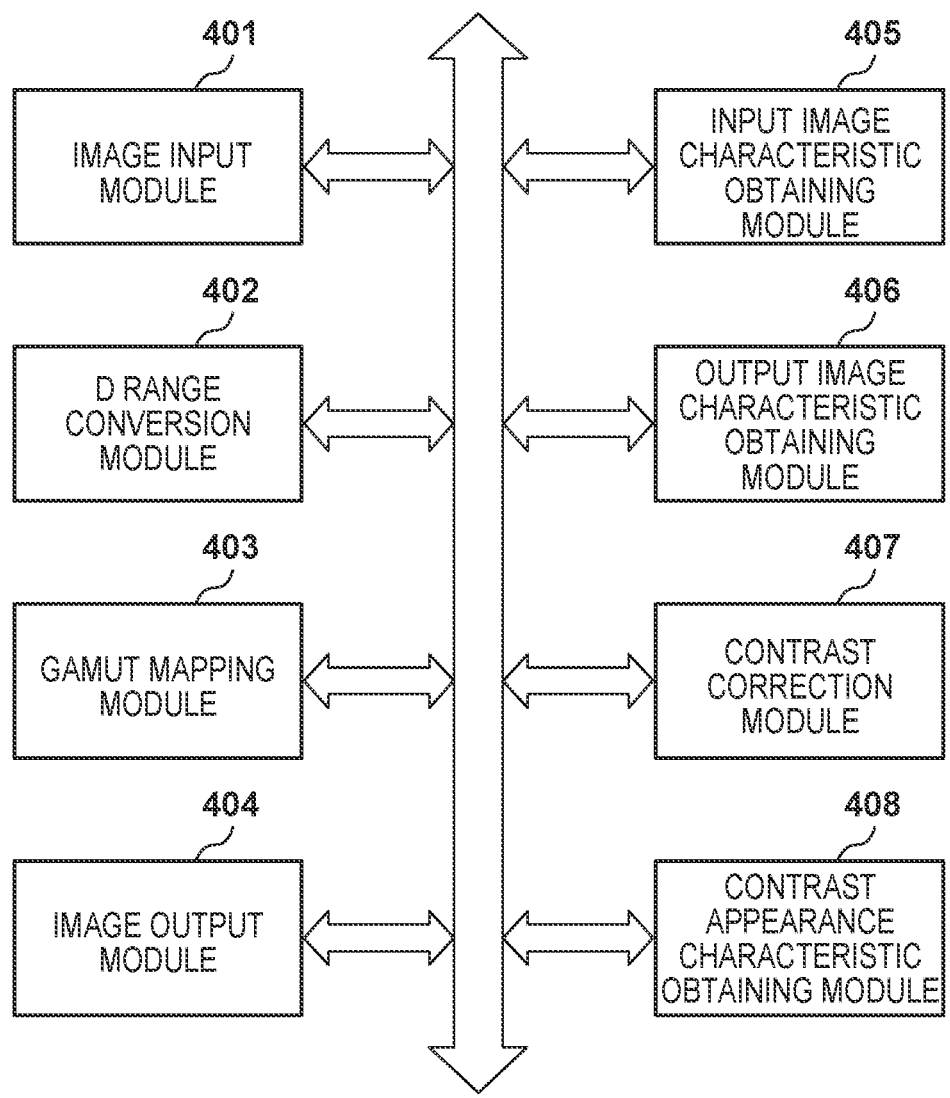
FIG. 16 is a block diagram showing an example of a software configuration concerning contrast correction according to the sixth embodiment.

FIG. 16 is a block diagram showing an example of a software configuration according to this embodiment. The software configuration further includes a contrast appearance characteristic obtaining module 408, unlike the configurator shown in FIG. 4 described in the first embodiment. An image input module 401 according to this embodiment further obtains the output apparatus (a printer in this embodiment) designated in the output apparatus setting box 1304 of the UI configuration screen 1301 and the output paper size designated in the output paper size setting box 1305. The image input module 401 obtains the observation distance designated in the observation distance setting box 1306 and the luminance value of illumination light set in the illumination light setting box 1307. The image input module 401 also obtains HDR image data designated in the path box 1302 of the UI configuration screen 1301.

[Filtering Processing]

In the first embodiment, filtering processing has been described with reference to FIG. 6. In this embodiment, a filter to be used in the above-described filtering processing can be set in the following way by a contrast appearance characteristic obtaining module 408 shown in FIG. 16 in consideration of the observation condition.

First, the number PDppd of pixels located in a predetermined viewing angle is calculated from the obtained observation condition (output paper size, observation distance). Here, the predetermined viewing angle is set to 1°.

First, the number PDppi of pixels per inch is calculated by $$PD_{ppi} = \sqrt{H_p^2 + V_p^2}/S \quad (16)$$

where Hp is the number of pixels in the horizontal direction of the image, Vp is the number of pixel in the vertical direction of the image, and S is the diagonal output paper size in inches.

Next, the number PDppd of pixels for a viewing angle of 1° can be calculated using $$PDppd = 1/\tan^{-1}((25.4/PDppi)/D) \quad (17)$$

where D is the observation distance [mm].

A filter condition is set using the number PDppd of pixels for a viewing angle of 1° calculated by equation (17). Here, the filter condition indicates the size of a filter. When the number PDppd of pixels for a viewing angle of 1° is used, an angular resolution PDcpd can be calculated by $$PDcpd = PDppd/2 \quad (18)$$

The calculated angular resolution PDcpd is set as the filter size of a Gaussian filter, and this filter is defined as a filter M. Note that here, PDcpd is directly set as the filter size of the Gaussian filter. However, the present invention is not limited to this. For example, a table representing the correspondence relationship between PDcpd and the filter size may be held in advance, and the filter size may be set by referring to the table. Alternatively, in a case of the above-described edge preservation type filter, filtering processing is performed by determining edge portions and portions other than the edges. For this reason, in addition to set values concerning the filter size, set values (for example, a luminance difference) concerning whether an image is a target of filtering processing are necessary. Hence, in addition to the filter size, set values concerning whether an image is a target of filtering processing may be set based on the observation condition.

[Contrast Correction Processing]

In the first embodiment, contrast processing by a contrast correction module 407 has been described with reference to FIG. 9. At this time, the above-described correction intensity Hm may be calculated based on the observation condition as well. Using the luminance value of the illumination light obtained by the image input module 401, the contrast appearance characteristic obtaining module 408 calculates a ratio Sr to the contrast sensitivity value at the luminance value of the illumination light serving as a reference in the following way. Then, the correction intensity Hm is obtained using the calculated ratio Sr. Here, the luminance value of the illumination light serving as a reference means a luminance value serving as a reference that the appearance of the effect of contrast correction should match. The luminance value of the illumination light serving as a reference may be set by the user as a set value (not shown) in the UI configuration screen 1301 on the image input module 401. Alternatively, the luminance value may be held internally as a predetermined value. The contrast sensitivity ratio Sr is calculated using a contrast sensitivity value S(ur, Ls) at a luminance value Ls of illumination light in the observation environment and a contrast sensitivity value S(ur, Lr) at the luminance value of the illumination light serving as a reference. Note that ur is the high sensitivity frequency at the luminance value of the illumination light serving as a reference.

As the calculation method of ur, a Barten model is used. According to the Barten model, the contrast sensitivity can be calculated by equation (19).

Here, assume that k=3.3, T=0.1, η=0.025, h=357×3600, a contrast variation $\Phi_{ext(n)}$ corresponding to external noise=0, and a contrast variation $\Phi_0$ corresponding to neural noise=3×10$^{-8}$ [sec deg$^2$]. In addition, XE=12 [deg], and NE=15 [cycle] (0 and 90 [deg], for a frequency of 2 [c/deg] or more, 45 [deg] and NE=7.5 [cycles]). Assume that σ$_0$=0.0133 [deg], and Csph=0.0001 [deg/mm$^3$].

$$S(u) = \frac{1}{k}\sqrt{\frac{T}{2}} \frac{M_{opt}(u)}{\sqrt{\left(\frac{1}{\eta h I_L} + \frac{\Phi_0}{(1-F(u))^2} + \Phi_{ext(u)}\right) \cdot \left(\frac{1}{X_0^2} + \frac{1}{X_E^2} + \left(\frac{u}{N_E}\right)^2\right)}} \quad (19)$$

Note that σ, Mopt(u), (1−F(u))$^2$, d, and IL are calculated by equations (20) to (24).

$$d = 4.6 - 2.8 \cdot \tanh(0.4 \cdot \mathrm{Log10}(0.625 \cdot L)) \quad (20)$$

$$\sigma = \sqrt{\sigma_0^2 + (C_{sph} \cdot d^3)^2} \quad (21)$$

-continued $$Mopt(u) = e^{-\pi 2\sigma 2u2} \quad (22)$$

$$IL = \pi/4d^2 L \quad (23)$$

$$(1 - F(u))^2 = 1 - \exp\left(-\frac{u^2}{u_0^2}\right) \quad (24)$$

Figure 17:
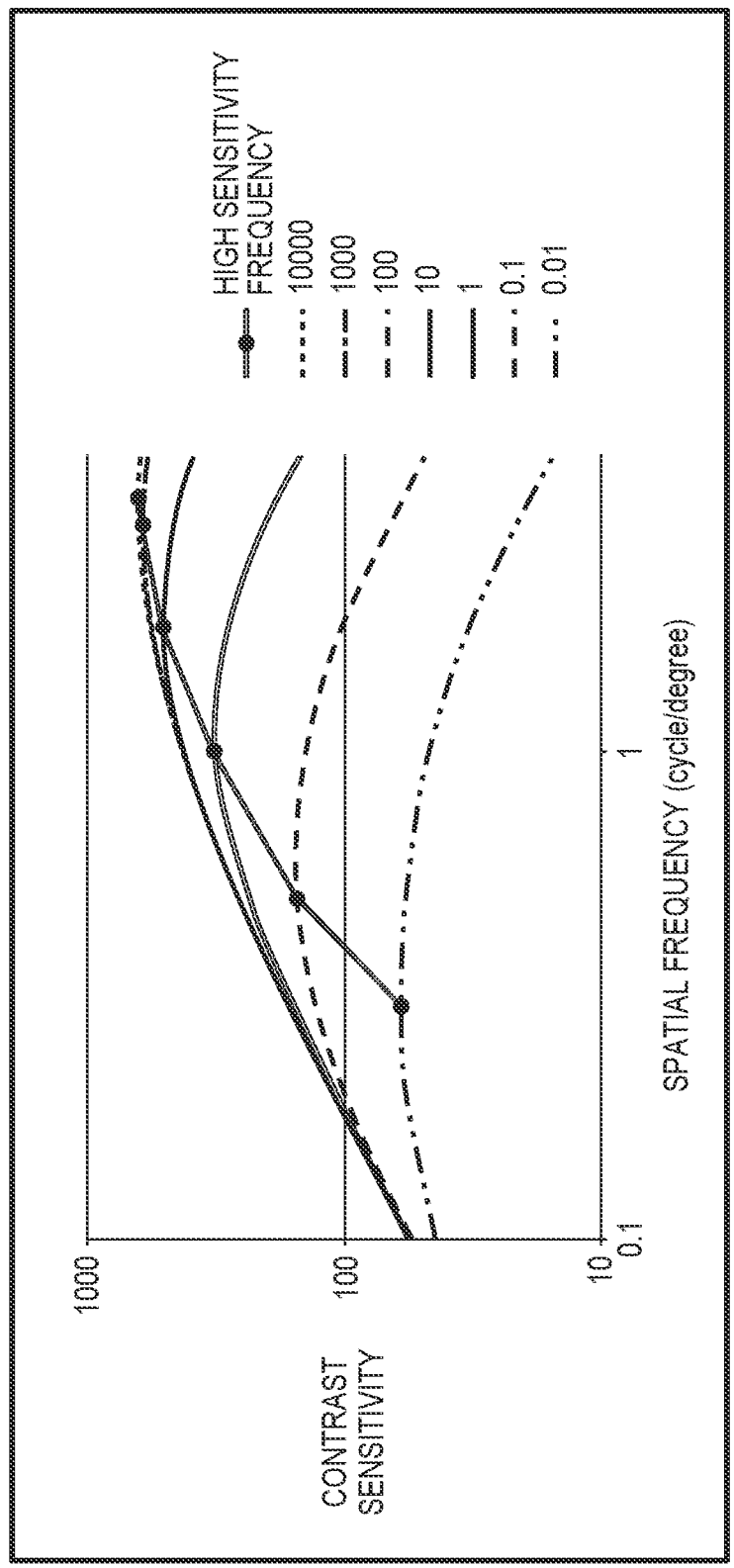
FIG. 17 is a view showing an example of a luminance-high sensitivity frequency conversion table according to the sixth embodiment.
Figures 18, 19:
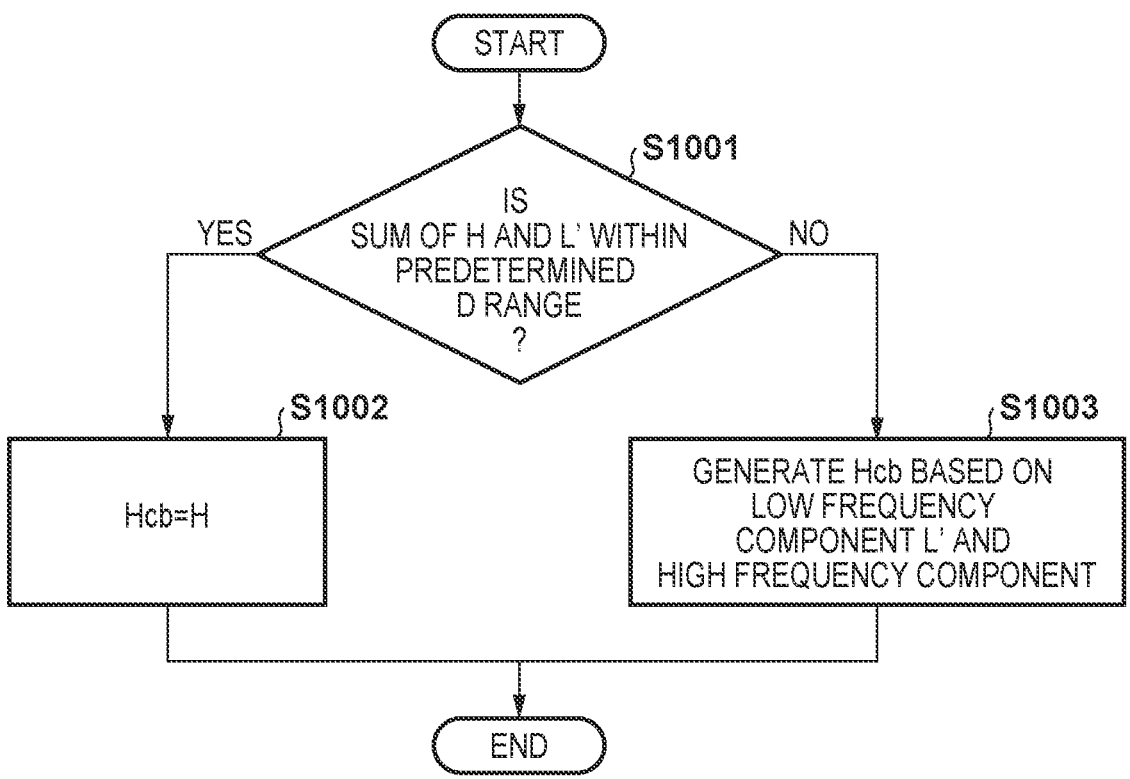
FIG. 18 is a view showing a table of high sensitivity frequencies on a luminance basis according to the sixth embodiment.
FIG. 19 is a flowchart showing the procedure of processing according to the eighth embodiment.

In equations (19) to (24), when the target luminance value is set to L, and the spatial frequency is set to u, the contrast sensitivity of the spatial frequency u at the target luminance L can be calculated. FIG. 17 is a graph that plots the contrast sensitivity calculated for each luminance by the Barten model. As the luminance becomes high, the frequency of a high contrast sensitivity transitions to the high frequency side. To the contrary, as the luminance becomes low, the frequency of a high contrast sensitivity transitions to the low frequency side, as can be seen. Contrast sensitivities for a plurality of spatial frequencies may be calculated in advance in correspondence with a plurality of luminance values using equations (19) to (24), and a luminance-high sensitivity frequency conversion table in which spatial frequencies of maximum values are associated with the luminance values may be held. FIG. 18 shows an example of the luminance-high sensitivity frequency conversion table. In a case in which a luminance value that is not described in the table is set, a high sensitivity frequency can be calculated by defining an approximate function that connects high sensitivity frequencies on a luminance basis, as shown in FIG. 17.

S(ur, Ls) and S(ur, Lr) can be calculated from equation (19) described above. When the calculated S(ur, Ls) and S(ur, Lr) are used, the contrast sensitivity ratio can be calculated by $$Sr = S(ur,Lr)/S(ur,Ls) \quad (25)$$

The contrast correction module 407 generates a contrast correction intensity. When the contrast sensitivity ratio Sr calculated by a contrast sensitivity ratio calculation unit 1401, a value Hta of a target high frequency as the target of correction, and a value H' of the output high frequency after gamut mapping are used, the contrast correction intensity Hm can be represented by $$Hm = Sr \times (Hta/H') \quad (26)$$

In addition, when the values of high frequencies are generated by an input image characteristic obtaining module 405 and an output image characteristic obtaining module 406 by the method of equation (7), the contrast correction intensity Hm can be represented by $$Hm = Sr \times (Hta - H') \quad (27)$$

Next, as for contrast ratio calculation processing, the contrast sensitivity S(ur, Lr) at the luminance value of the illumination light serving as a reference is calculated, and the contrast sensitivity S(ur, Ls) at the luminance value of the illumination light in the observation environment is calculated. Then, the contrast sensitivity ratio Sr is calculated using the contrast sensitivity S(ur, Lr) of the illumination light serving as a reference and the contrast sensitivity S(ur, Ls) of the illumination light in the observation environment.

When contrast correction processing is performed using the above-described method, the effect of contrast correction considering the observation condition can be held. In the above-described embodiment, the contrast appearance characteristic obtaining module 408 sets the filter M in consideration of the observation condition, obtains a low-frequency component L using the filter M, and sets the contrast correction intensity using the contrast sensitivity value calculated based on the observation condition. However, only one of them may suffice.

[Modification]

In the above-described sixth embodiment, as in steps S101 to S103, the value H' of the high frequency is generated from the image data that has undergone the D range compression and gamut mapping, and the contrast correction module 407 obtains the contrast correction intensity Hm using H' and the input image data Ht, and corrects the value of the high frequency using this. However, the following processing may be performed in place of correction of the high-frequency component H using the correction intensity Hm. That is, in step S202 of the sixth embodiment, the value L of the low frequency and the value H of the high frequency are obtained using the filter M generated based on the observation condition by the contrast appearance characteristic obtaining module 408, and D range compression is performed for the obtained value L of the low frequency to generate a value L' of the low frequency. Then, a luminance I' may be obtained by integrating the value H of the high frequency and the value L' of the low frequency.

Additionally, in the sixth embodiment, when performing contrast correction, contrast correction may be performed by setting the value Hm to the above-described ratio Sr to the contrast sensitivity value, that is, by setting Hm=Sr, instead of obtaining the correction intensity Hm from the input image data Ht and the image data that has undergone the D range compression and the gamut mapping. In this case, the value L of the low frequency and the value H of the high frequency may be obtained using the filter M generated based on the observation condition. However, not the filter M but a filter prepared without being based on the observation condition may be used.

Seventh Embodiment

As the seventh embodiment of the present invention, a form that considers highlight detail loss or shadow detail loss at the time of dynamic range compression will be described. Note that a description of components that overlap the above embodiments will appropriately be omitted, and a description will be made with focus placed on differences.

As image processing of correcting lowering of a contrast caused when D range compression as described above is performed, Retinex processing is used. In the Retinex processing, first, an image is separated into an illumination light component and a reflected light component. When the illumination light component is D-range-compressed, and the reflected light component is held, D range compression can be performed while holding the contrast of the original image.

It can be said that the illumination light component is substantially a low-frequency component, and the reflected light component is substantially a high-frequency component. In this embodiment, the low-frequency component or the illumination light component will be referred to as a first component, and the high-frequency component or the reflected light component will be referred to as a second component hereinafter.

Figure 2A:
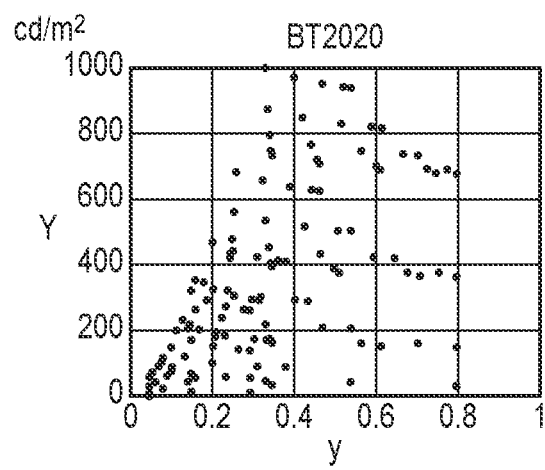
FIGS. 2A, 2B, 2C, and 2D are views for explaining the difference in color gamut between BT.2020 and a printing apparatus.
Figure 2B:
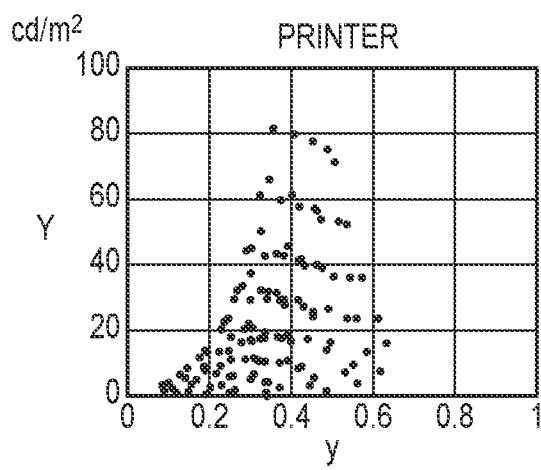
Figure 2C:
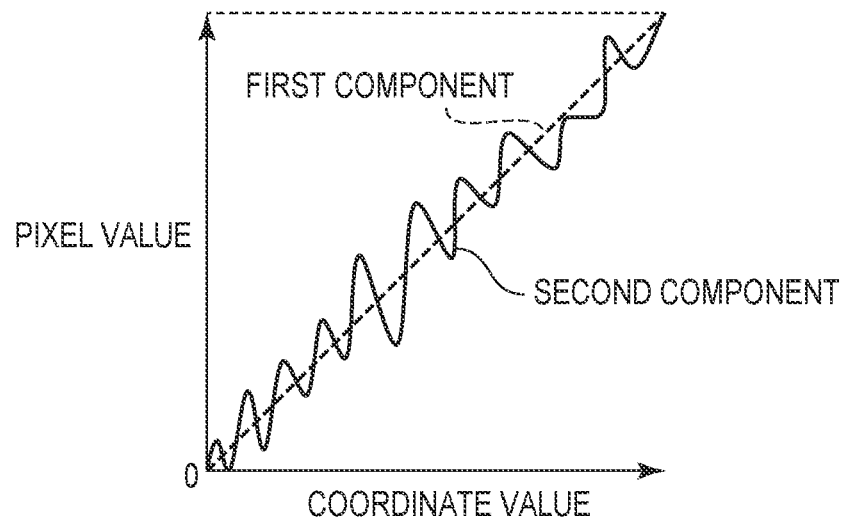
Figure 2D:
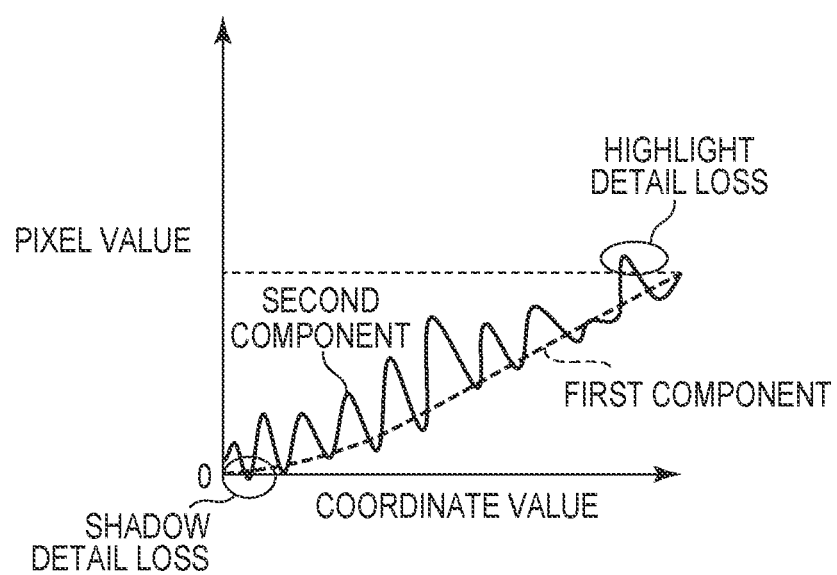

At this time, in a case in which the shape of the color gamut of input image data and the shape of the color gamut of a printing apparatus are largely different, even when contrast correction is performed using the conventional method, the contrast obtained at the time of printing may be different from the intended contrast due to compression by gamut mapping. Furthermore, if the pixel value of the second component is large on the high luminance side or on the low luminance side, the output image may exceed the D range of the output, and highlight detail loss or shadow detail loss occurs. FIGS. 2C and 2D show the principle of occurrence of highlight detail loss/shadow detail loss. In FIGS. 2C and 2D, the ordinate represents the pixel value, and the abscissa represents the coordinate values of an image. FIGS. 2C and 2D show the first component of the image and pixel values obtained by adding the second component to the first component before D range compression and after D range compression, respectively. After D range compression is performed for the first component of the image to obtain the first component, the second component maintains the value before the D range compression. In this case, as indicated by the pixel values obtained by adding the second component, the values are clipped by the upper and lower limits (the dotted lines in FIG. 2D) of the D range on the high luminance side and on the low luminance side, and highlight detail loss or shadow detail loss occurs. That is, if the value of the low-frequency component is D-range-compressed to the high luminance side or low luminance side, highlight detail loss/shadow detail loss readily occurs.

In consideration of the above-described problem, this embodiment aims at suppressing highlight detail loss or shadow detail loss in the contrast at the time of dynamic range compression.

[Contrast Correction Processing]

In the first embodiment, contrast processing by a contrast correction module 407 has been described with reference to FIG. 9. In this embodiment, processing is performed in the following way in steps S204 and S205 of FIG. 9. The processes of steps S201 to S203 are the same as in the first embodiment. In step S204, in addition to the process of step S204 described in the first embodiment, a second component correction module (not shown) in the contrast correction module 407 corrects the second component to prevent the high-frequency component, that is, the second component corrected by the contrast correction module 407 from exceeding the D range of the input which is the luminance range of the input and causing highlight detail loss/shadow detail loss. Note that since the output from the contrast correction module 407 has the same D range as the input, the second component is corrected not to exceed the luminance range of the output as well. Here, the second component is corrected in the following way based on the value of a first component L before D range conversion. The highlight detail loss/shadow detail loss readily occurs when L is on the high luminance side or on the low luminance side. Hence, the larger or the smaller the value L becomes, the higher the degree of correction of the second component is.

When Hc>1

When Hc>1, highlight detail loss may occur on the high luminance side. For this reason, correction is performed such that the second component becomes close to 1 as the value of a first component L' becomes large. Here, the second component is corrected using a correction coefficient P below.

$$Hcb=(1-P(L',L'_{max},L'_{min}))H+P(L',L'_{max},L'_{min})\cdot 1 \quad (28)$$

When Hc<1

When Hc<1, shadow detail loss may occur on the low luminance side. For this reason, correction is performed such that the second component becomes close to 1 as the value L becomes small. The second component is corrected using a correction coefficient Q below.

$$Hcb=Q(L',L'_{max},L'_{min})H+(1-Q(L',L'_{max},L'_{min}))\cdot 1 \quad (29)$$

When Hc=1

When Hc=1, since highlight detail loss/shadow detail loss shadow is not caused by the addition of the second component, the second component is not corrected.

The correction coefficients P and Q are calculated in the following way.

$$P(L', L'_{max}, L'_{min}) = \frac{1}{1+\exp\left(-\alpha\left(\frac{L'-L'_{min}}{L'_{min}-L'_{max}}-t_1\right)\right)} \quad (30)$$

$$Q(L', L'_{max}, L'_{min}) = \frac{1}{1+\exp\left(-\beta\left(\frac{L'-L'_{min}}{L'_{max}-L'_{min}}-t_2\right)\right)} \quad (31)$$

where α, β, t1, and t2 are predetermined constants. If the first component after D range compression has a halftone, the second component is not so suppressed. The second component is suppressed only when the first component after D range compression is on the high luminance side or on the low luminance side.

In step S205, the contrast correction module 407 combines a value Hcb of the high frequency after the contrast correction and the correction of the second component in step S204, the value L of the low frequency calculated in step S202, and value Cb and Cr generated in step S201 to obtain the original RGB data. First, the contrast correction module 407 integrates the value Hc of the high frequency after the contrast correction and the value L of the low frequency by equation (32), thereby obtaining a luminance I' after the contrast correction by combining the values of the frequencies.

$$I'=Hcb\times L \quad (32)$$

Note that when the value Hc of the high frequency and the value L of the low frequency are generated using equation (7) described in the first embodiment, the second component is corrected in the following way to prevent the second component corrected by the contrast correction module 407 from exceeding the D range of the input and causing highlight detail loss/shadow detail loss.

When Hc>0

When Hc>0, highlight detail loss may occur on the high luminance side. For this reason, correction is performed such that the absolute value of the second component becomes small as the value of the first component L becomes large. Here, the second component is corrected using a correction coefficient W.

$$Hcb=W(L,L_{max},L_{min})Hc \quad (33)$$

When Hc<0

When Hc<0, shadow detail loss may occur on the low luminance side. For this reason, correction is performed such that the absolute value of the second component becomes small as the value L becomes small. Here, the second component is corrected using a correction coefficient S.

$$Hcb=S(L,L_{max},L_{min})Hc \quad (34)$$

Here, the correction coefficients W and S are calculated by $$W(L, L_{max}, L_{min}) = \frac{1}{1+\exp\left(-\alpha\left(\frac{L-L_{min}}{L_{max}-L_{min}}-t_1\right)\right)} \quad (35)$$

$$S(L, L_{max}, L_{min}) = \frac{1}{1 + \exp\left(-\beta\left(\frac{L - L_{min}}{L_{max} - L_{min}} - t_2\right)\right)} \quad (36)$$

When Hc=0

When Hc=0, since highlight detail loss/shadow detail loss shadow is not caused by the addition of the value of the second component Hc, nothing is performed.

Here, $\alpha$, $\beta$, t1, and t2 are predetermined constants. If the first component has a halftone, the second component is not so suppressed. The second component is suppressed only when the value of the first component is on the high luminance side or on the low luminance side.

In addition, $L_{max}$ and $L_{min}$ are the maximum value and the minimum value of the D range of the input, respectively. Note that the correction coefficients W and S need not always be Sigmoid-type functions as described above. The function is not particularly limited as long as it makes the absolute value of the second component Hcb after the correction smaller than the absolute value of the second component Hc before the correction.

In addition, equations (33) and (34) may be executed by obtaining W(L') and S(L') using an LUT calculated for each value L' in advance. When the LUT prepared in advance is used, the processing load needed for the operation can be reduced, and the processing speed can be improved.

In this case, the luminance I' can be represented by $$I' = Hcb + L \quad (37)$$

The contrast correction module 407 then plane-combines the luminance I' and the color difference values (Cb, Cr) to generate color image values (I', Cb, Cr). The image that has undergone the contrast correction according to this embodiment is thus obtained.

The procedure of processing is the same as that described with reference to FIG. 9 in the first embodiment, and a description thereof will be omitted.

As described above, in this embodiment, the second component of the HDR image is corrected in advance in consideration of the contrast lowering caused by the D range conversion and the gamut mapping. In addition, after the second component correction, processing is performed to prevent highlight detail loss/shadow detail loss from occurring. When the contrast correction considering the contrast lowering caused by the gamut mapping is performed in advance for the HDR image, the contrast can easily be maintained even after the gamut mapping.

Eighth Embodiment

The eighth embodiment will be described with reference to the flowchart of FIG. 19.

The flowchart of FIG. 19 shows the procedure of processing of highlight detail loss/shadow detail loss determination. In this determination, it is determined, based on the value of a first component L' after D range compression and the value of a second component H before the D range compression, whether to perform highlight detail loss/shadow detail loss correction. When the highlight detail loss/shadow detail loss determination is performed based on the values of both the first component L' after D range compression and the second component H, a pixel that causes highlight detail loss/shadow detail loss can more correctly be specified. Furthermore, by correcting only the pixel that causes highlight detail loss/shadow detail loss, lowering of the contrast of a pixel that does not cause highlight detail loss/shadow detail loss can be prevented. The rest is the same as in the seventh embodiment.

In step S1001, a contrast correction module 407 determines whether to correct highlight detail loss/shadow detail loss based on the second component H before D range compression and the first component L' after D range compression.

Figure 20:
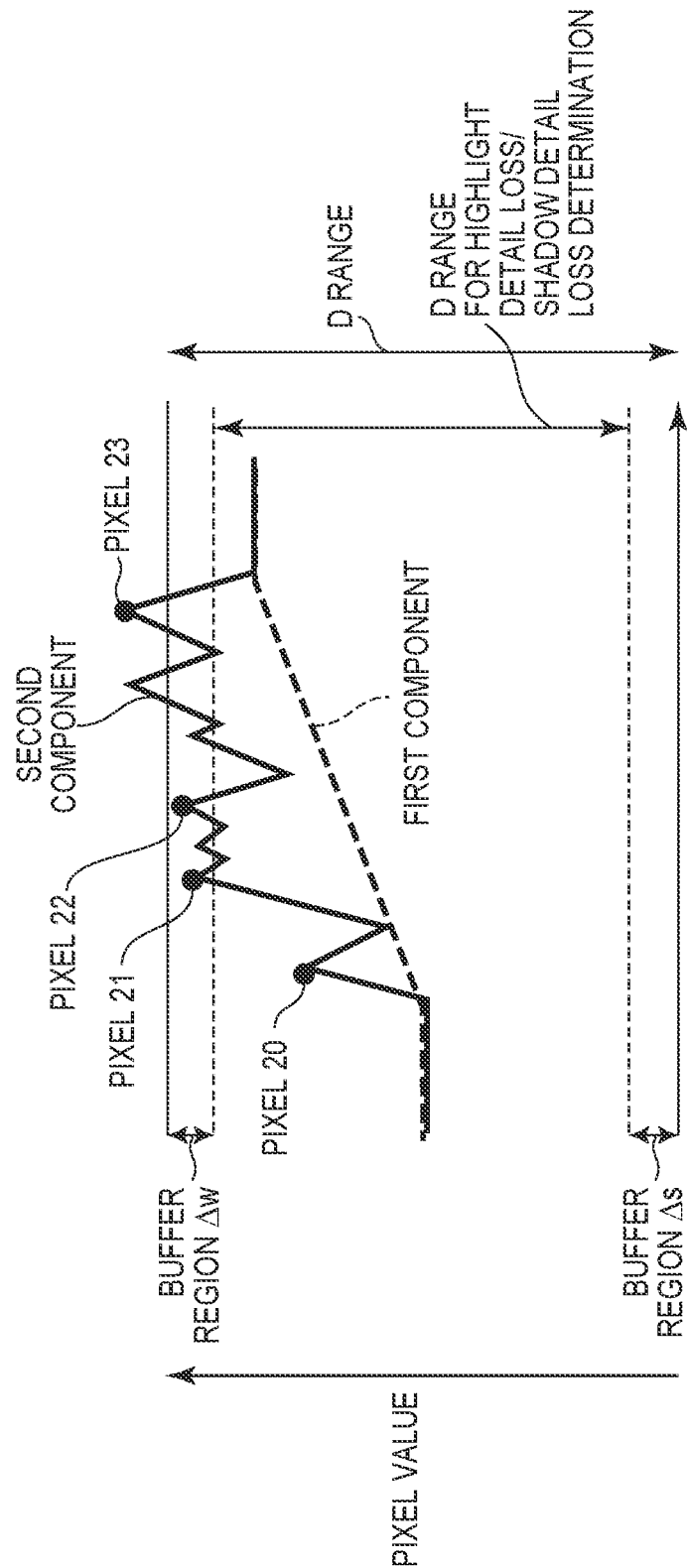
FIG. 20 is an explanatory view of correction determination in the processing according to the eighth embodiment.

More specifically, in accordance with the result of addition of the first component L' after D range compression and the second component H, it is determined whether to perform highlight detail loss/shadow detail loss correction. FIG. 20 shows the outline of the determination. The highlight detail loss/shadow detail loss correction determination D range in FIG. 20 is a D range determined in advance for highlight detail loss/shadow detail loss determination, and buffer regions $\Delta_W$ and $\Delta_S$ represent the luminance intervals between the D range after compression and the highlight detail loss/shadow detail loss correction determination D range.

(1) When L'+H falls within the range of the highlight detail loss/shadow detail loss correction determination D range (pixel 20)

In this case, since highlight detail loss/shadow detail loss does not occur, correction is not performed.

(2) When L'+H falls outside the range of the highlight detail loss/shadow detail loss correction determination D range and also falls within the range of the D range after compression (pixel 21)

In this case, highlight detail loss/shadow detail loss does not occur. However, to prevent tone inversion caused as the result of highlight detail loss/shadow detail loss correction, the pixel is set to the target pixel of highlight detail loss/shadow detail loss correction.

(3) When L'+H falls outside the range of the D range after compression (pixel 23)

In this case, highlight detail loss/shadow detail loss occurs. The pixel is set to the target pixel of highlight detail loss/shadow detail loss correction.

The second component correction module (not shown) in the contrast correction module 407 corrects the second component in accordance with equations below based on the result of the above-described highlight detail loss/shadow detail loss correction determination. In the equation, $\alpha$ is a predetermined constant, Thmax is the maximum value of a predetermined D range for highlight detail loss/shadow detail loss determination, and $Th_{min}$ is the minimum value, which are determined in advance to prevent an adverse effect in the image after the second component is corrected.

In a case of highlight detail loss (L'+H>$Th_{max}$)

In step S1003, the second component correction module corrects the second component to suppress highlight detail loss.

$$Hcb = L_{max} - \Delta_w \exp(-\alpha H) - L' \quad (38)$$

In a case of shadow detail loss (L'+H<$Th_{min}$)

In step S1003, the second component correction module corrects the second component to suppress shadow detail loss.

$$Hcb = L_{max} - \Delta_s \exp(\alpha H) - L' \quad (39)$$

In cases other than the above cases, highlight detail loss/shadow detail loss does not occur, and in step S1002, the second component correction module does not correct the second component (equation (40)).

$$Hcb = H \quad (40)$$

Note that buffer regions $\Delta_W$ and $\Delta_s$ in equations (36) and (37) are calculated by $$\Delta_W = L_{max} - Th_{max} \quad (41)$$

$$\Delta_S = Th_{min} - L_{min} \quad (42)$$

Note that a constant $H_{max}$ much larger than H may be set to perform calculation as follows.

In a case of highlight detail loss ($L'+H > Th_{max}$)

$$H_{cb} = L_{max} - \Delta \frac{H}{H_{max}} - L' \quad (43)$$

In a case of shadow detail loss ($L'+H < Th_{min}$)

$$H_{cb} = L_{min} - \Delta \frac{H}{H_{max}} - L' \quad (44)$$

In cases other than the above cases, the second component is not corrected, like equation (40).

As described above, in this embodiment, highlight detail loss/shadow detail loss correction determination is performed, and correction can be performed only for the second component that needs highlight detail loss/shadow detail loss correction. Accordingly, lowering of the contrast can be suppressed in a case in which the first component is on the high luminance side or on the low luminance side, but highlight detail loss/shadow detail loss hardly occurs depending on the value of the second component.

Ninth Embodiment

Figure 21:
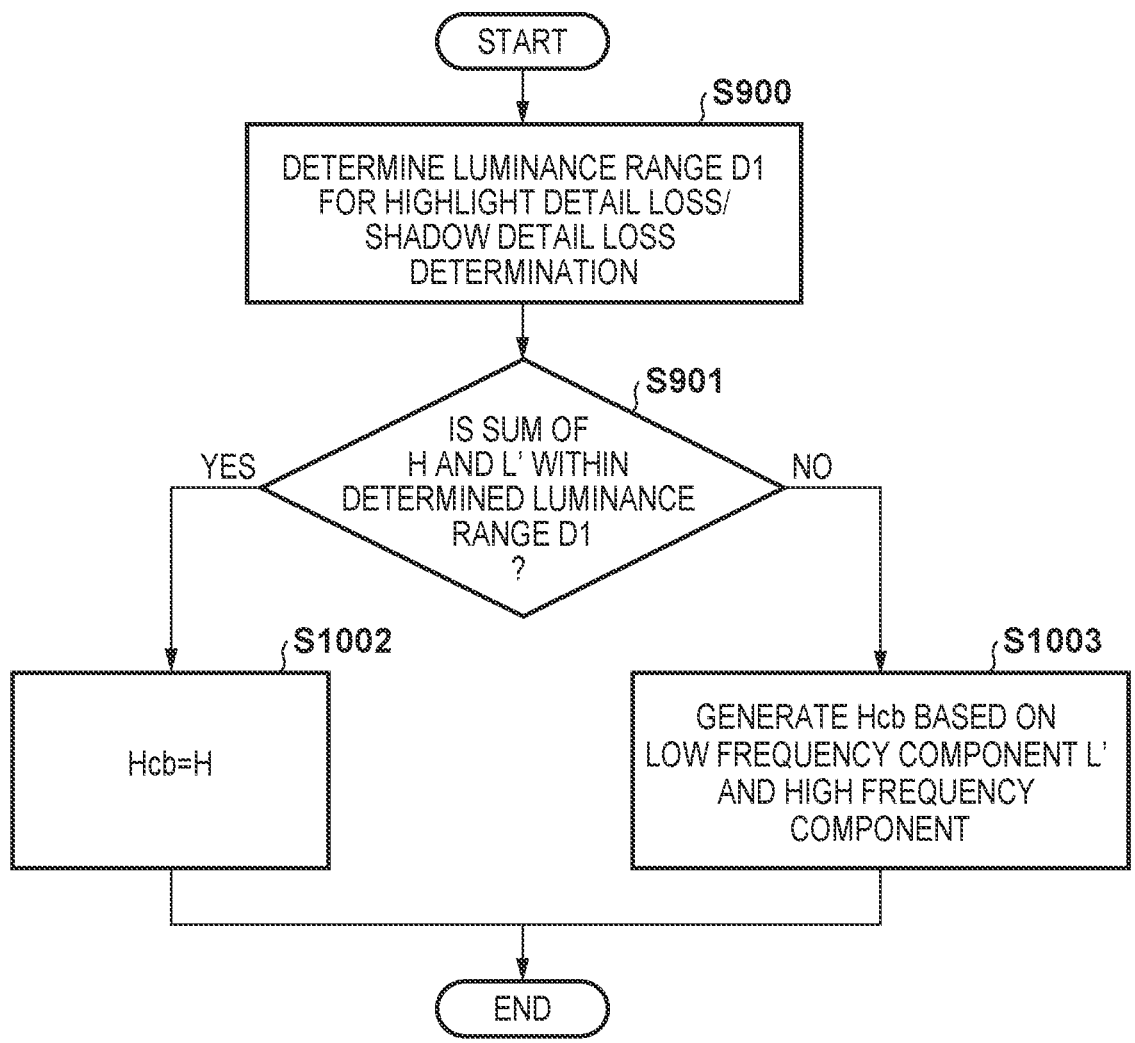
FIG. 21 is a flowchart showing the procedure of processing according to the ninth embodiment.

The ninth embodiment will be described with reference to the flowchart of FIG. 21. FIG. 21 shows details of highlight detail loss/shadow detail loss correction performed by a contrast correction module 407.

In this embodiment, in the highlight detail loss/shadow detail loss determination described in the eighth embodiment, it is determined whether to perform highlight detail loss/shadow detail loss correction based on a first component L' after D range compression, and a second component H before D range compression, and a just-noticeable difference (JND), which are decided in step S900 (S901).

When JND is taken into consideration at the time of highlight detail loss/shadow detail loss correction determination, the contrast after the second component correction can easily be perceived. For example, in FIG. 20, if the widths of buffer regions $\Delta_W$ and $\Delta_S$ are less than JND, the luminance difference between pixels 21 and 22 after second component correction is difficult to perceive. This is because even if the second component is corrected such that it falls within the buffer region to prevent highlight detail loss/shadow detail loss, the contrast is visually lost because the width of the buffer region is less than JND. Hence, the widths of the buffer regions $\Delta_W$ and $\Delta_S$ are preferably larger than JND.

The contrast correction module 407 holds the value of the just-noticeable difference (JND) for a luminance by a JND holding module (not shown).

Note that the value of JND may be calculated at the start of a program and held in a memory (a RAM 302 or a RAM 314 shown in FIG. 3) until the end of the program, or an LUT may be held in an external file and loaded as needed. Alternatively, the value of JND may be calculated each time.

JND is a threshold to allow a person to recognize a difference. A luminance difference less than JND is hardly perceived.

Figure 22:
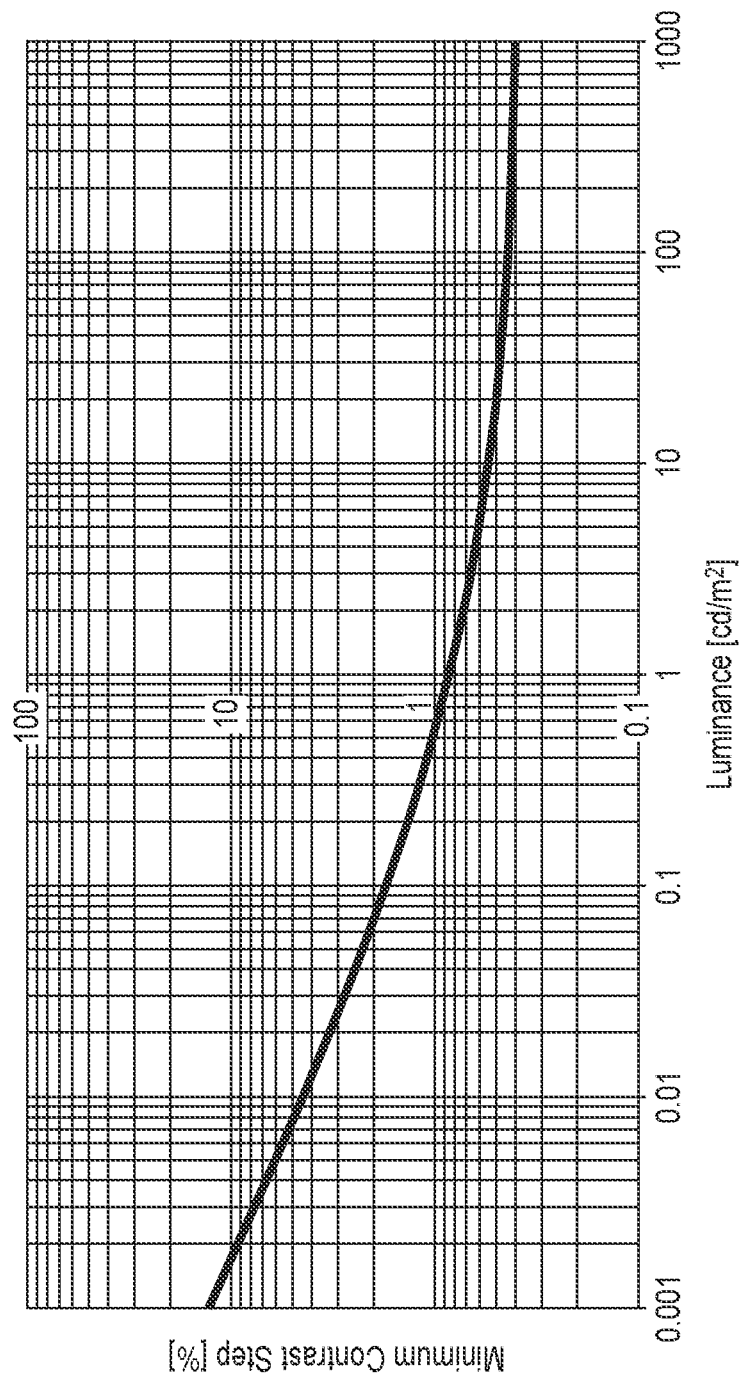
FIG. 22 is a view for explaining a correction intensity generation method according to the 10th embodiment.

JND is obtained from, for example, a Barten model as shown in FIG. 22. The Barten model is the physiological model of a visual system formed by a mathematical description. The abscissa in FIG. 22 represents the luminance value, and the ordinate in FIG. 22 represents the minimum contrast step perceivable by a human with respect to the luminance value. Here, letting Lj be a certain luminance value, and Lj+1 be a luminance value obtained by adding JND to Lj, a minimum contrast step me is defined by, for example, $$m_t = \frac{L_{j+1} - L_j}{L_{j+1} + L_j} \quad (45)$$

Based on equation (43), JND at the luminance value Lj is represented by $$JND = \frac{1+m_t}{1-m_t} L_j - L_j \quad (46)$$

This shows that when the luminance difference is equal to or more than JND, a human can perceive the luminance difference. As models representing the visual characteristic, various mathematical models such as a Weber model and a DeVries-Rose model have been proposed in addition to the Barten model. In addition, JND may be a numerical value found experimentally or empirically by sensory evaluation or the like.

In the highlight detail loss/shadow detail loss determination, the widths of the buffer regions $\Delta_W$ and $\Delta_S$ in FIG. 20 are decided to be equal to or more than JND, thereby reducing lowering of the visual contrast after highlight detail loss/shadow detail loss correction. That is, if the width of the buffer region is less than JND, the luminance difference in the buffer region is difficult to perceive. When the width of the buffer region is equal to or more than JND, the contrast in the buffer region is easily perceived even after correction of the second component.

FIG. 21 shows the procedure of highlight detail loss/shadow detail loss correction processing according to the ninth embodiment. Step S900 of deciding the highlight detail loss/shadow detail loss correction determination D range is added to the procedure shown in FIG. 19 according to the eighth embodiment, and determination is performed using the decided D range.

In step S900, the contrast correction module 407 decides the maximum value Thmax and the minimum value Thmin of the highlight detail loss/shadow detail loss correction determination D range to satisfy $$\Delta_W = L_{max} - Th_{max} \geq JDN(L_{max}) \quad (47)$$

$$\Delta_S = Th_{min} - L_{min} \geq JDN(L_{min}) \quad (48)$$

Processing after highlight detail loss/shadow detail loss correction determination is the same as in the eighth embodiment other than that determination is performed using the decided luminance range D1.

As described above, in the ninth embodiment, at the time of highlight detail loss/shadow detail loss correction determination, the width of the buffer region to correct the second component is decided in consideration of the visual characteristic JND. When the width of the buffer region is equal to or more than JND, loss of the contrast after second component correction can be reduced.

10th Embodiment

In the seventh to ninth embodiments, highlight detail loss/shadow detail loss correction is performed after the contrast correction module 407 performs contrast correction. In the 10th embodiment, the contrast correction module corrects the second component and corrects highlight detail loss or shadow detail loss without performing contrast correction. Note that in this embodiment, an image processing apparatus 300 may not include a contrast correction module 407, and may have the function of a correction module configured to correct the second component in the following way. The rest is the same as in the seventh embodiment.

Figure 23:
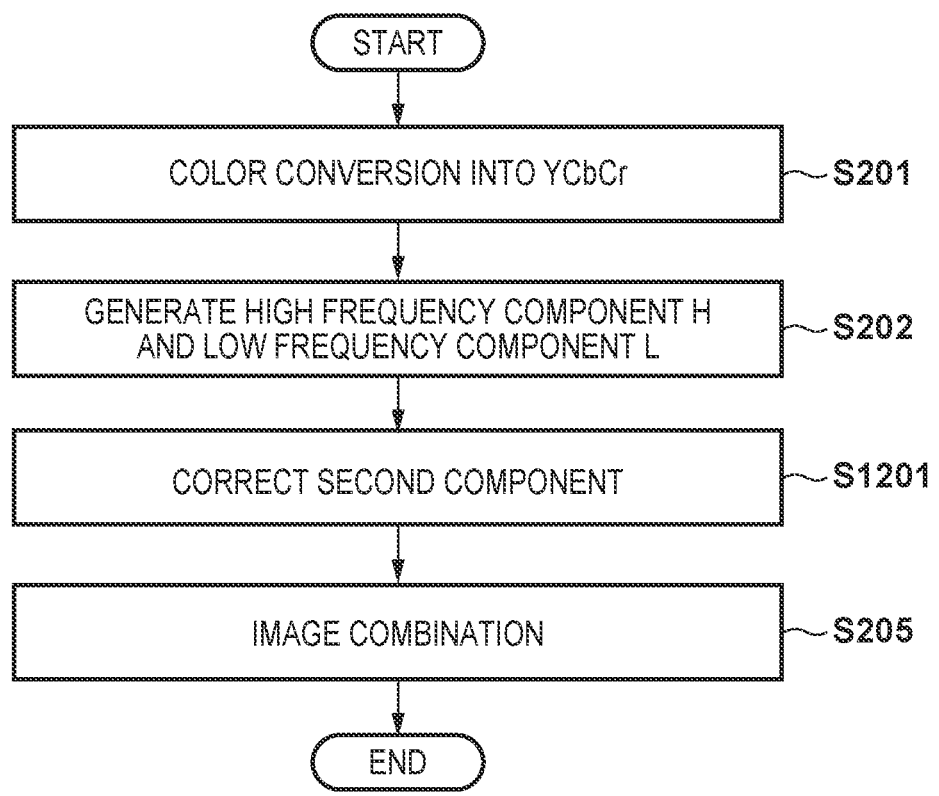
FIG. 23 is a flowchart showing the procedure of processing according to the 10th embodiment.

FIG. 23 is a flowchart showing the procedure of image processing according to this embodiment. Unlike the procedure of FIG. 9 shown in the first embodiment, steps S203 and S204 in FIG. 9 are replaced with second component correction of step S1201 in FIG. 10.

Figure 9:
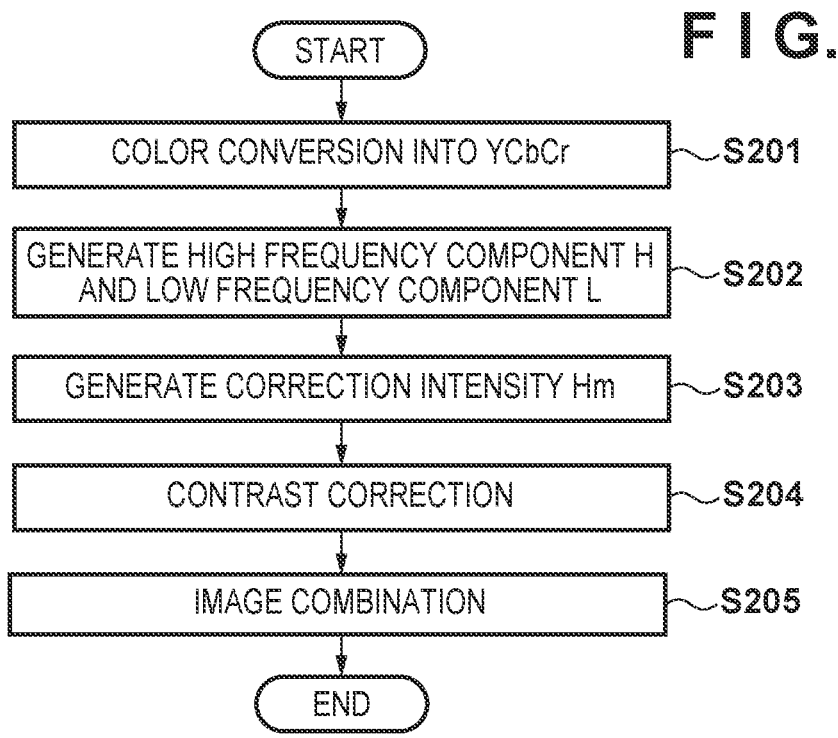
FIG. 9 is a flowchart showing the processing of a contrast correction module according to the present invention.

Steps S201 and S202 are the same as in FIG. 9 described in the first embodiment.

Next, in step S1201, the second component is corrected in the following way.

When H>0

When H>0, highlight detail loss may occur on the high luminance side. For this reason, correction is performed such that the absolute value of a second component H becomes small as the value of a first component L' after D range compression becomes large. Here, the second component H is corrected using a correction coefficient W below, thereby obtaining Hcb.

$$Hcb=W(L',L'_{max},L'_{min})H \qquad (49)$$

When H<0

When H<0, shadow detail loss may occur on the low luminance side. For this reason, correction is performed such that the absolute value of the second component becomes small as the value L' becomes small. The second component H is corrected using a correction coefficient S below.

$$Hcb=S(L',L'_{max},L'_{min})H \qquad (50)$$

When H=0

When H=0, since highlight detail loss/shadow detail loss shadow is not caused by the addition of the second component, the second component is not corrected.

Here, the correction coefficients W and S are calculated by $$W(L', L'_{max}, L'_{min}) = 1 - \frac{1}{1+\exp\left(-\alpha\left(\frac{L'-L'_{min}}{L'_{max}-L'_{min}}-t_1\right)\right)} \qquad (51)$$

$$S(L', L'_{max}, L'_{min}) = \frac{1}{1+\exp\left(-\beta\left(\frac{L'-L'_{min}}{L'_{max}-L'_{min}}-t_2\right)\right)} \qquad (52)$$

Here, α, β, t1, and t2 are predetermined constants. As the position of the first component is moved to the high luminance side or the low luminance side, the second component is suppressed.

In addition, $L'_{max}$ and $L'_{min}$ are the maximum value and the minimum value of the luminance of the D range after compression, respectively.

When a nonlinear function is applied to the correction coefficient in this way, the second component can be strongly suppressed as the position of the first component moves to the high luminance side or the low luminance side.

Note that the correction coefficients W and S need not always be Sigmoid-type functions as described above. Any function can be used for the decision as long as it is a function for strongly suppressing the second component as the position of the first component moves to the high luminance side or the low luminance side.

Note that equations (49) and (50) may be executed by obtaining W(L') and S(L') using an LUT calculated for each value L' in advance. When the LUT prepared in advance is used, the processing load needed for the operation can be reduced, and the processing speed can be improved.

Note that the correction coefficients W and S may be calculated using the value of the first component L before D range compression. When the first component L before D range compression is used, the D range compression and the second component correction processing can be performed in parallel, and the calculation efficiency improves. Letting $L_{max}$ and $L_{min}$ be the maximum value and the minimum value of the luminance of the D range before compression, the correction of the second component in this case is performed in the following way.

When H>0

$$Hcb=W(L,L_{max},L_{min})H \qquad (53)$$

When H<0

$$Hcb=S(L,L_{max},L_{min})H \qquad (54)$$

When H=0
Nothing is performed.
Step S205 is performed as in the first embodiment.

11th Embodiment

The 11th embodiment of the present invention will be described. The procedure of processing is the same as in FIG. 11 described in the second embodiment, and a description will be made using this. In addition, a description of portions that overlap the above embodiments will be omitted, and only differences will be described. The processes of steps S401 to S403 are the same as in the second embodiment.

In step S404, a contrast correction module 407 performs, for the value of the high frequency of image data that has undergone D range conversion in step S402, contrast correction by the method described above with reference to FIG. 9 using a contrast correction intensity Hm generated in step S403. That is, steps S403 and S404 of this processing procedure correspond to the processing shown in FIG. 9 described in the first embodiment. Furthermore, highlight detail loss/shadow detail loss correction is performed in the following way as in the seventh embodiment.

Note that in a case in which a value Hc of a high frequency and a value K of a low frequency are generated using equation (7), When Hc>1

When Hc>1, highlight detail loss may occur on the high luminance side. For this reason, correction is performed such that the second component becomes close to 1 as the value of a first component L' becomes large. Here, the second component is corrected using a correction coefficient P below.

$$Hcb=(1-P(L',L'_{max},L'min))H+P(L',L'_{max},L'min)\cdot 1 \qquad (55)$$

When Hc<1

When Hc<1, shadow detail loss may occur on the low luminance side. For this reason, correction is performed such that the second component becomes close to 1 as the value L becomes small. The second component is corrected using a correction coefficient Q below.

$$Hcb = Q(L', L'_{max}, L'_{min})H + (1 - Q(L', L'_{max}, L'_{min})) \cdot 1 \quad (56)$$

When Hc=1

When Hc=1, since highlight detail loss/shadow detail loss shadow is not caused by the addition of the second component, the second component is not corrected.

The correction coefficients P and Q are calculated in the following way.

$$P(L', L'_{max}, L'_{min}) = 1 - \frac{1}{1 + \exp\left(-\alpha\left(\frac{L' - L'_{min}}{L'_{min} - L'_{max}} - t_1\right)\right)} \quad (57)$$

$$Q(L', L'_{max}, L'_{min}) = \frac{1}{1 + \exp\left(-\beta\left(\frac{L' - L'_{min}}{L'_{max} - L'_{min}} - t_2\right)\right)} \quad (58)$$

where α, β, t1, and t2 are predetermined constants. If the first component after D range compression has a halftone, the second component is not so suppressed. The second component is suppressed only when the first component after D range compression is on the high luminance side or on the low luminance side.

In step S405, the contrast correction module 407 combines a value Hcb of the high frequency after the contrast correction and second component correction in step S404, the value L of the low frequency calculated in step S202 of FIG. 9, and value Cb and Cr generated in step S201 of FIG. 9 to obtain the original RGB data. First, the contrast correction module 407 integrates the value Hc of the high frequency after the contrast correction and the value L of the low frequency by equation (59), thereby obtaining a luminance I' after the contrast correction by combining the values of the frequencies.

$$I' = Hcb \times L \quad (59)$$

Note that when the value Hc of the high frequency and the value L of the low frequency are generated using equation (7), the second component is corrected in the following way to prevent the second component corrected by the contrast correction module 407 from exceeding the D range of the input and causing highlight detail loss/shadow detail loss.

When Hc>0

When Hc>0, highlight detail loss may occur on the high luminance side. For this reason, correction is performed such that the absolute value of the second component becomes small as the value of the first component L becomes large. Here, the second component is corrected using a correction coefficient W.

$$Hcb = W(L, L_{max}, L_{min})Hc \quad (60)$$

When Hc<0

When Hc<0, shadow detail loss may occur on the low luminance side. For this reason, correction is performed such that the absolute value of the second component becomes small as the value L becomes small. Here, the second component is corrected using a correction coefficient S.

$$Hcb = S(L, L_{max}, L_{min})Hc \quad (61)$$

Here, the correction coefficients W and S are calculated by $$W(L', L'_{max}, L'_{min}) = 1 - \frac{1}{1 + \exp\left(-\alpha\left(\frac{L - L_{min}}{L_{max} - L_{min}} - t_1\right)\right)} \quad (62)$$

$$S(L', L'_{max}, L'_{min}) = \frac{1}{1 + \exp\left(-\beta\left(\frac{L - L_{min}}{L_{max} - L_{min}} - t_2\right)\right)} \quad (63)$$

When Hc=0

In this case, since highlight detail loss/shadow detail loss shadow is not caused by the addition of the value of the second component Hc, nothing is performed.

Here, α, β, t1, and t2 are predetermined constants. If the first component has a halftone, the second component is not so suppressed. The second component is suppressed only when the value of the first component is on the high luminance side or on the low luminance side.

In addition, $L_{max}$ and $L_{min}$ are the maximum value and the minimum value of the D range of the input, respectively. Note that the correction coefficients W and S need not always be Sigmoid-type functions as described above. The function is not particularly limited as long as it makes the absolute value of the second component Hcb after the correction smaller than the absolute value of the second component Hc before the correction.

In addition, equations (60) and (61) may be executed by obtaining W(L') and S(L') using an LUT calculated for each value L' in advance. When the LUT prepared in advance is used, the processing load needed for the operation can be reduced, and the processing speed can be improved.

In this case, the luminance I' can be represented by $$I' = Hcb + L \quad (64)$$

The contrast correction module 407 then plane-combines the luminance I' and the color difference values (Cb, Cr) to generate color image values (I', Cb, Cr). The image that has undergone the contrast correction according to this embodiment is thus obtained.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-125278, filed Jun. 29, 2018, No. 2018-207405, filed Nov. 2, 2018, and No. 2018-125046, filed Jun. 29, 2018, which are hereby incorporated by reference herein in their entirety.

What is claimed is:

1. An image processing apparatus comprising:
a performing unit configured to perform gamut mapping of mapping a color indicated by image data to a color of a color reproduction range of a printing apparatus;
an extracting unit configured to extract a high-frequency component from a luminance of the image data; and
a modifying unit configured to modify the high-frequency component by an intensity, wherein the intensity is generated based on a characteristic of the gamut mapping.

2. The apparatus according to claim 1,
wherein characteristics of the gamut mapping are obtained based on a first high-frequency component extracted from the luminance of the image data before the gamut mapping is performed by the performing unit, and a second high-frequency component extracted from the luminance of image data after the gamut mapping is performed by the performing unit.

3. The apparatus according to claim 2, wherein the extraction unit
extracts the first high-frequency component by subtracting a first low-frequency component from the luminance of the image data, the first low-frequency component being generated by filtering the luminance of the image data before the gamut mapping is performed by the performing unit, and
extracts the second high-frequency component by subtracting a second low-frequency component from the luminance of the image data, the second low-frequency component being generated by filtering the luminance of the image data after the gamut mapping is performed by the performing unit.

4. The apparatus according to claim 3, wherein the intensity of the modifying is generated by subtracting the second high-frequency component from the first high-frequency component.

5. The apparatus according to claim 2, wherein the extraction unit
extracts the first high-frequency component by dividing the luminance of the image data by a first low-frequency component, the first low-frequency component being generated by filtering the luminance of the image data before the gamut mapping is performed by the performing unit, and
extracts the second high-frequency component by dividing the luminance of the image data by a second low-frequency component, the second low-frequency component being generated by filtering the luminance of the image data after the gamut mapping is performed by the performing unit.

6. The apparatus according to claim 5, wherein the intensity of the modifying is generated by dividing the first high-frequency component by the second high-frequency component.

7. The apparatus according to claim 1, wherein the extracting unit extracts a reflected light component of the luminance of the image data as the high-frequency component.

8. The apparatus according to claim 7, wherein the extracting unit extracts an illumination light component of the luminance of the image data as the low-frequency component.

9. The apparatus according to claim 1, wherein the performing unit performs the gamut mapping after the modifying by the modifying unit.

10. The apparatus according to claim 1, wherein the modifying unit modifies the high-frequency component after the performing unit performs the gamut mapping.

11. The apparatus according to claim 1, further comprising,
a dynamic range compression unit configured to perform a dynamic range compression to the luminance of the image data.

12. The apparatus according to claim 11, wherein the dynamic range compression unit performs the dynamic range compression to a low-frequency component extracted from the luminance of the image data.

13. The apparatus according to claim 1, further comprising:
an input unit configured to input information about an observation condition when observing an image printed on a sheet by the printing apparatus based on the image data; and
a decision unit configured to decide a contrast characteristic concerning a degree of appearance of a contrast in the printed image based on the information about the observation condition input by the input unit,
wherein the modifying unit performs modifying the luminance of the image data based on the characteristic and the contrast characteristic decided by the decision unit such that the intensity becomes higher for the color that is not included in the color reproduction range of the printing apparatus than for the color included in the color reproduction range of the printing apparatus.

14. The apparatus according to claim 1, wherein the modifying unit modifies the high-frequency component of the image data based on the low-frequency component of the luminance of the image data such that the high-frequency component of luminance of the image data after the modifying is included in a luminance range of the image data after the modifying by the modifying unit.

15. The apparatus according to claim 1, wherein the modifying unit further comprises a determination unit configured to determine whether to perform the correction based on a luminance of a low-frequency component of the image after the conversion processing and a luminance of a high-frequency component of the image after the conversion processing.

16. The apparatus according to claim 1, wherein the modifying unit modifies the high frequency component such that the intensity becomes higher for a color that is not included in the color reproduction range of the printing apparatus than for a color included in the color reproduction range of the printing apparatus.

17. The apparatus according to claim 1, wherein the input image is reproducible in a color reproduction range wider than the color reproduction range of the printing apparatus.

18. The apparatus according to claim 1, wherein the extracting unit extracts the high-frequency component by separating the luminance of the image data into the high-frequency component and a low-frequency component.

19. The apparatus according to claim 18, wherein the extracting unit extracts the high-frequency component by filtering the luminance of the image data to generate the low-frequency component and subtracting the value of the low frequency from the luminance of the image data.

20. The apparatus according to claim 18, wherein the extracting unit extracts the high-frequency component by filtering the luminance of the image data to generate the low-frequency component and dividing the luminance of the image data by the value of the low frequency.

21. The apparatus according to claim 18, wherein the low-frequency component is not modified by the intensity.

22. An image processing method comprising:
performing gamut mapping of mapping a color indicated by image data to a color of a color reproduction range of a printing apparatus;
extracting a high-frequency component from a luminance of the image data; and
modifying the high-frequency component by an intensity, wherein the intensity is generated based on a characteristic of the gamut mapping.

23. The method according to claim 22,
wherein characteristics of the gamut mapping are obtained based on a first high-frequency component extracted from the luminance of the image data before the gamut mapping is performed by the performing unit, and a second high-frequency component extracted from the luminance of image data after the gamut mapping is performed by the performing unit.

24. The method according to claim 23, wherein the extracting
extracts the first high-frequency component subtracting a first low-frequency component from the luminance of the image data, the first low-frequency component being generated by filtering the luminance of the image data before the gamut mapping is performed by the performing unit, and
extracts the second high-frequency component by subtracting a second low-frequency component from the luminance of the image data, the second low-frequency component being generated by filtering the luminance of the image data after the gamut mapping is performed by the performing unit.

25. The method according to claim 24, wherein the intensity of the modifying is generated by subtracting the second high-frequency component from the first high-frequency component.

26. The method according to claim 23, wherein the extracting
extracts the first high-frequency component by dividing the luminance of the image data by a first low-frequency component, the first low-frequency component being generated by filtering the luminance of the image data before the gamut mapping is performed by the performing unit, and
extracts the second high-frequency component by dividing the luminance of the image data by a second low-frequency component, the second low-frequency component being generated by filtering the luminance of the image data after the gamut mapping is performed by the performing unit.

27. The method according to claim 26, wherein the intensity of the modifying is generated by dividing the first high-frequency component by the second high-frequency component.

28. The method according to claim 22, wherein the extracting extracts a reflected light component of the luminance of the image data as the high-frequency component.

29. The method according to claim 28, wherein the extracting extracts an illumination light component of the luminance of the image data as the low-frequency component.

30. The method according to claim 22, wherein the performing performs the gamut mapping after the modifying.

31. The method according to claim 22, wherein the modifying modifies the high-frequency component after the performing unit performs the gamut mapping.

32. The method according to claim 22, further comprising:
performing a dynamic range compression to the luminance of the image data.

33. The method according to claim 32, wherein the performing the dynamic range compression performs the dynamic range compression to a low-frequency component extracted from the luminance of the image data.

34. The method according to claim 22, further comprising:
inputting information about an observation condition when observing an image printed on a sheet by the printing apparatus based on the image data; and
deciding a contrast characteristic concerning a degree of appearance of a contrast in the printed image based on the information about the observation condition input in the inputting,
wherein the modifying modifies the luminance of the image data based on the characteristic and the contrast characteristic decided in the deciding such that the intensity becomes higher for the color that is not included in the color reproduction range of the printing apparatus than for the color included in the color reproduction range of the printing apparatus.

35. The method according to claim 22, wherein the modifying modifies the high-frequency component of the image data based on the low-frequency component of luminance of the image data such that the high-frequency component of luminance of the image data after the modifying is included in a luminance range of the image data after the modifying.

36. The method according to claim 22, wherein the modifying further comprises determining whether to perform the correction based on a luminance of a low-frequency component of the image after the conversion processing and a luminance of a high-frequency component of the image after the conversion processing.

37. The method according to claim 22, wherein the modifying modifies the high frequency component such that the intensity becomes higher for a color that is not included in the color reproduction range of the printing apparatus than for a color included in the color reproduction range of the printing apparatus.

38. The method according to claim 22, wherein the extracting extracts the high-frequency component by separating the luminance of the image data into the high-frequency component and a low-frequency component.

39. The method according to claim 38, wherein the extracting extracts the high-frequency component by filtering the luminance of the image data to generate the low-frequency component and subtracting the value of the low frequency from the luminance of the image data.

40. The apparatus according to claim 39, wherein the low-frequency component is not modified by the intensity.

41. The method according to claim 38, wherein the extracting extracts the high-frequency component by filtering the luminance of the image data to generate the low-frequency component and dividing the luminance of the image data by the value of the low frequency.

42. A non-transitory computer-readable medium storing a program that causes a computer to function as:
a performing unit configured to perform gamut mapping of mapping a color indicated by image data to a color of a in the color reproduction range of a printing apparatus
an extracting unit configured to extract a high-frequency component from a luminance of the image data; and
a modifying unit configured to modify the high-frequency component by an intensity, wherein the intensity is generated based on a characteristic of the gamut mapping.

43. The medium according to claim 42, wherein
characteristics of the gamut mapping are obtained based on a first high-frequency component extracted from the luminance of the image data before the gamut mapping is performed by the performing unit, and a second high-frequency component extracted from the luminance of image data after the gamut mapping is performed by the performing unit.

44. The medium according to claim 43, wherein the extraction unit
extracts the first high-frequency component by subtracting a first low-frequency component from the luminance of the image data, the first low-frequency component being generated by filtering the luminance of the image data before the gamut mapping is performed by the performing unit, and
extracts the second high-frequency component by subtracting a second low-frequency component from the luminance of the image data, the second low-frequency component being generated by filtering the luminance of the image data after the gamut mapping is performed by the performing unit.

45. The medium according to claim 44, wherein the intensity of the modifying is generated by subtracting the second high-frequency component from the first high-frequency component.

46. The medium according to claim 43, wherein the extraction unit
extracts the first high-frequency component by dividing the luminance of the image data by a first low-frequency component, the first low-frequency component being generated by filtering the luminance of the image data before the gamut mapping is performed by the performing unit, and
extracts the second high-frequency component by dividing the luminance of the image data by a second low-frequency component, the second low-frequency component being generated by filtering the luminance of the image data after the gamut mapping is performed by the performing unit.

47. The medium according to claim 46, wherein the intensity of the modifying is generated by dividing the first high-frequency component by the second high-frequency component.

48. The medium according to claim 42, wherein the extracting unit extracts a reflected light component of the luminance of the image data as the high-frequency component.

49. The apparatus according to claim 48, wherein the extracting unit extracts an illumination light component of the luminance of the image data as the low-frequency component.

50. The medium according to claim 42, wherein the performing unit performs the gamut mapping after the modifying by the modifying unit.

51. The medium according to claim 42, wherein the modifying unit modifies the high-frequency component after the performing unit performs the gamut mapping.

52. The medium according to claim 42, further comprising:
a dynamic range compression unit configured to perform a dynamic range compression to the luminance of the image data.

53. The apparatus according to claim 52, wherein the dynamic range compression unit performs the dynamic range compression to a low-frequency component extracted from the luminance of the image data.

54. The medium according to claim 42, wherein the program further causing the computer to function as:
an input unit configured to input information about an observation condition when observing an image printed on a sheet by the printing apparatus based on the image data; and
a decision unit configured to decide a contrast characteristic concerning a degree of appearance of a contrast in the printed image based on the information about the observation condition input by the input unit,
wherein the modifying unit performs modifying the luminance of the image data based on the characteristic and the contrast characteristic decided by the decision unit such that the intensity becomes higher for the color that is not included in the color reproduction range of the printing apparatus than for the color included in the color reproduction range of the printing apparatus.

55. The medium according to claim 42, wherein the modifying unit modifies the high-frequency component of the image data based on the low-frequency component of the luminance of the image data such that the high-frequency component of luminance of the image data after the modifying is included in a luminance range of the image data after the modifying by the modifying unit.

56. The medium according to claim 42, wherein the modifying unit further comprises a determination unit configured to determine whether to perform the correction based on a luminance of a low-frequency component of the image after the conversion processing and a luminance of a high-frequency component of the image after the conversion processing.

57. The medium according to claim 42, wherein the modifying unit modifies the high frequency component such that the intensity becomes higher for a color that is not included in the color reproduction range of the printing apparatus than for a color included in the color reproduction range of the printing apparatus.

58. The medium according to claim 42, wherein the extracting unit extracts the high-frequency component by separating the luminance of the image data into the high-frequency component and a low-frequency component.

59. The apparatus according to claim 58, wherein the extracting unit extracts the high-frequency component by filtering the luminance of the image data to generate the low-frequency component and subtracting the value of the low frequency from the luminance of the image data.

60. The apparatus according to claim 58, wherein the extracting unit extracts the high-frequency component by filtering the luminance of the image data to generate the low-frequency component and dividing the luminance of the image data by the value of the low frequency.

61. The apparatus according to claim 58, wherein the low-frequency component is not modified by the intensity.

62. An image processing apparatus comprising:
   a performing unit configured to perform gamut mapping of mapping a color indicated by image data to a color of a color reproduction range of an output apparatus;
   an extracting unit configured to extract a high-frequency component from a luminance of the image data and
   a modifying unit configured to modify the high-frequency component by an intensity, wherein the intensity is generated based on a characteristic of the gamut mapping.

63. The apparatus according to claim 42, wherein the input image is reproducible in a color reproduction range wider than the color reproduction range of the output apparatus.

64. An image processing method comprising:
   performing gamut mapping of mapping a color indicated by image data to a color of a color reproduction range of an output apparatus;
   extracting a high-frequency component from a luminance of the image data; and
   modifying the high-frequency component by an intensity, wherein the intensity is generated based on a characteristic of the gamut mapping.

65. The method according to claim 64, wherein the input image is reproducible in a color reproduction range wider than the color reproduction range of the output apparatus.

66. A non-transitory computer-readable medium storing a program that causes a computer to function as:
   a performing unit configured to perform gamut mapping of mapping a color indicated by image data to a color of a in the color reproduction range of an output apparatus;
   an extracting unit configured to extract a high-frequency component from a luminance of the image data; and
   a modifying unit configured to modify the high-frequency component by an intensity, wherein the intensity is generated based on a characteristic of the gamut mapping.

67. The medium according to claim 66, wherein the input image is reproducible in a color reproduction range wider than the color reproduction range of the output apparatus.

* * * * *